(12) United States Patent
Oya

(10) Patent No.: US 6,991,849 B2
(45) Date of Patent: Jan. 31, 2006

(54) NEAR INFRARED RAY SHIELDING FILM

(75) Inventor: Taro Oya, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/362,229

(22) PCT Filed: Jun. 18, 2002

(86) PCT No.: PCT/JP02/06055
§ 371 (c)(1),
(2), (4) Date: Feb. 21, 2003

(87) PCT Pub. No.: WO03/000779
PCT Pub. Date: Jan. 3, 2003

(65) Prior Publication Data
US 2003/0186040 A1 Oct. 2, 2003

(30) Foreign Application Priority Data
Jun. 21, 2001 (JP) .............................. 2001-187872
Sep. 21, 2001 (JP) .............................. 2001-288623

(51) Int. Cl.
B32B 7/12 (2006.01)
B32B 27/06 (2006.01)
H04N 5/65 (2006.01)

(52) U.S. Cl. ...................... 428/353; 428/343; 428/483; 428/482; 359/361; 359/885; 348/819; 313/106

(58) Field of Classification Search ............... 428/64.1, 428/64.8, 65.1, 65.2, 68, 343, 354, 480, 483, 428/40.1, 41.3, 200, 214, 317.5, 353, 482, 428/403, 304.4, 195.1, 400; 359/350, 359, 359/360, 361, 885, 887; 313/106, 107, 110, 313/112, 387, 479; 348/819, 842; 252/587; 250/515.1; 283/88; 501/904; 430/944
See application file for complete search history.

(56) References Cited

U.S. PATENT DOCUMENTS 6,157,504 A * 12/2000 Yamada et al. ............. 359/885

(Continued)

FOREIGN PATENT DOCUMENTS

EP 1087243 3/2001

(Continued)

Primary Examiner—Stevan A. Resan
Assistant Examiner—Louis Falasco
(74) Attorney, Agent, or Firm—Sughrue Mion, PLLC

(57) ABSTRACT

A near infrared screening film which consists of a biaxially oriented film made from a polyester containing a near infrared light absorber having a weight reduction start temperature of at least 280° C. and which has a haze value of 5% or less and a total transmittance for visible lights having a wavelength of 400 to 650 nm of 40% or more and which is exemplified by having optical properties at visible and near infrared ranges which satisfy the following expressions (1) to (4):

$$1 < T(850) < 20 \quad (1)$$

$$1 < T(950) < 20 \quad (2)$$

$$-10 < T(620) - T(540) < 10 \quad (3)$$

$$-10 < T(450) - T(540) < 10 \quad (4)$$

wherein T(450), T(540), T(620), T(850) and T(950) are light transmittances at wavelengths of 450 nm, 540 nm, 620 nm, 850 nm and 950 nm, respectively.

This film is inexpensive, has high handling ease, a high visible light transmittance and the function of preventing the malfunction of peripheral equipment caused by near infrared lights from the screen of a plasma display, for example, and can be suitably used in the front panel of the plasma display.

18 Claims, 2 Drawing Sheets

U.S. PATENT DOCUMENTS

| | | | |
|---|---|---|---|
| 6,333,592 B1 * | 12/2001 | Sasa et al. | 313/110 |
| 6,391,400 B1 * | 5/2002 | Russell et al. | 359/359 |
| 6,398,900 B1 * | 6/2002 | Hieda et al. | 156/245 |
| 6,542,292 B2 * | 4/2003 | Onomichi et al. | 359/350 |
| 6,597,525 B2 * | 7/2003 | Kubota | 349/106 |

FOREIGN PATENT DOCUMENTS

| | | |
|---|---|---|
| JP | 1982-20509 | 2/1982 |
| JP | 57-198413 | 12/1982 |
| JP | 58-168526 | 10/1983 |
| JP | 59-012952 | 1/1984 |
| JP | 06-214113 | 8/1994 |
| JP | 10-156991 | 6/1998 |
| JP | 10-186128 | 7/1998 |
| JP | 10-188822 | 7/1998 |
| JP | 11-199683 | 7/1999 |
| JP | 2000-119356 | 11/1999 |
| JP | 2000-25181 | 1/2000 |
| JP | 2000-275432 | 10/2000 |
| JP | 2001-66419 | 3/2001 |
| JP | 2001-247526 | 9/2001 |

\* cited by examiner

F I G. 1
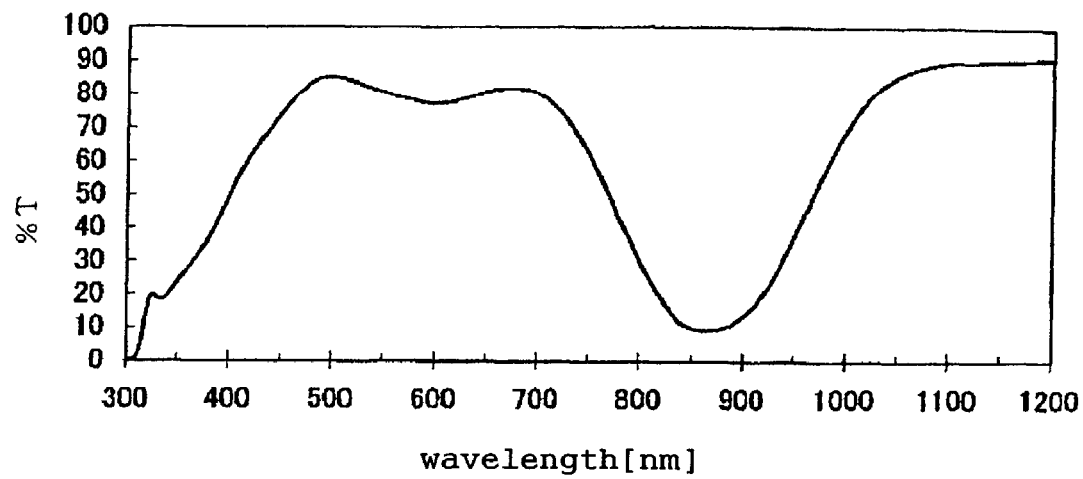
F I G. 2
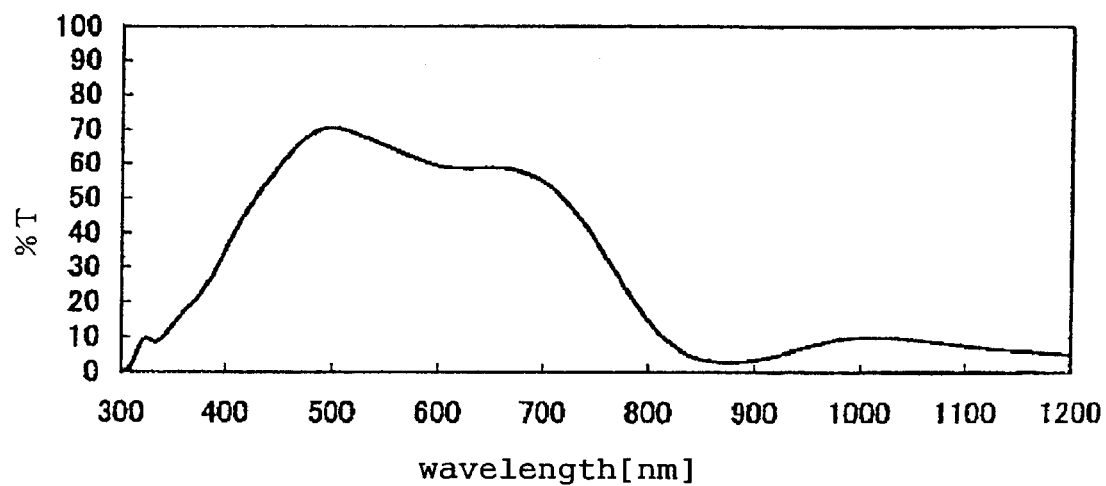

NEAR INFRARED RAY SHIELDING FILM

FIELD OF THE INVENTION

The present invention relates to a near infrared screening film and a laminated film comprising the same. More specifically, it relates to a near infrared screening film which is inexpensive, has excellent handling properties, high visible light transmission and excellent screening properties for near infrared rays having a wavelength of 820 to 980 nm and can be suitably used in the image display panel of a plasma display or the like, and to a laminated film comprising the same.

DESCRIPTION OF THE PRIOR ART

In the field of visual equipment typified by color TVs, the implementation of TVs of luminescent panel system using a plasma display or the like, non-luminescent panel system using a liquid crystal display or the like and rear projection system using a built-in image projector is now under way in addition to conventional direct-view TVs using a CRT to meet market demand for a large screen and a high-definition image.

However, in the plasma displays of luminescent panel system (PDP), rays having a wavelength other than the wavelengths of the three primary color (red, green and blue) rays of a color image are radiated due to the structural factor of each pixel portion constituting a light source or discharge portion. For example, strong radiation is measured at near infrared ranges having wavelengths around 820 nm, 880 nm and 980 nm. It is apprehended that this near infrared radiation may cause a problem such as the malfunction of peripheral equipment. The wavelengths of the radiated near infrared rays overlap or agree with the operation wavelengths of near infrared rays used by near infrared communication equipment such as the remote controllers of TVs, videos and air conditions, portable communication equipment and personal computers.

JP-A 10-156991 (the term "JP-A" as used herein means an "unexamined published Japanese patent application") proposes an extraneous light reflection preventing film which has the function of preventing the malfunction of peripheral equipment caused by near infrared rays and also the reflection of extraneous light and can be suitably used in the front panel of an image display device. In this extraneous light reflection preventing film, the function of preventing the malfunction of peripheral equipment caused by near infrared rays is provided by containing an expensive near infrared light absorber in a pressure sensitive adhesive layer. To achieve satisfactory near infrared ray absorptivity, the pressure sensitive adhesive layer is made as thick as 40 $\mu$m, for example.

The thickness of the pressure sensitive adhesive layer of a display such as a plasma display (PDP) is preferably in the range of 5 to 40 $\mu$m so as to prevent color nonuniformity caused by thickness nonuniformity. When the layer is thicker than 40 $\mu$m, it does not function as a self-adhesive and rather reduces handling properties in a processing or assembly step. The thickness of the pressure sensitive adhesive layer to be applied in the example of the above publication is 40 $\mu$m which is close to the above upper limit.

As another means of improving a screening effect, the amount of a near infrared light absorber added is increased. However, this reduces the bonding force of the pressure sensitive adhesive layer and handling properties. When an expensive near infrared light absorber is to be contained in the pressure sensitive adhesive layer, it is dissolved in a solvent and the resulting solution is applied with a roll coater or gravure coater, whereby a great loss is produced by the control of film thickness and productivity, thereby significantly boosting cost.

As still another means, a screening layer containing a near infrared light absorber is formed separate from a pressure sensitive adhesive layer. In this method, since a bonding function is not required of the screening layer, a problem such as a reduction in adhesion does not occur unlike the pressure sensitive adhesive layer but the total thickness of layers becomes large and it is extremely difficult to control the thickness of each layer.

In a plasma display (PDP), the amount of heat radiation is large and the temperature of the front panel is high. To prevent these, JP-A 10-188822 proposes a panel filter which serves to prevent the malfunction of peripheral equipment caused by near infrared rays and also cut off heat radiation and can be suitably used in the front panel of an image display device. As example of this, there is disclosed a panel filter which comprises a metal reflection layer for cutting off heat radiation formed on a transparent polyester base film, a transparent coating layer formed on the metal reflection layer and a transparent pressure sensitive adhesive layer having a thickness of 25 $\mu$m and containing a near infrared light absorber formed on this transparent coating layer or the other side of the base film.

Since the metal reflection layer of this filter cuts off both heat radiation and near infrared radiation, the thickness of the transparent pressure sensitive adhesive layer containing a near infrared light absorber may be small. However, the filter still has disadvantages such as increases in film thickness and the number of steps resulted by the formation of the metal reflection layer, thereby boosting cost.

Accordingly, a near infrared screening film which eliminates use of the above self-adhesive containing a near infrared light absorber and coating using a solvent and has a sufficiently large thickness and high film thickness accuracy has been desired.

SUMMARY OF THE INVENTION

It is an object of the present invention to provide a near infrared screening film which is inexpensive, has excellent handling properties, high visible light transmission and the function of preventing the malfunction of peripheral equipment caused by near infrared rays radiated from the screen of a plasma display and can be suitably used in the front panel of a plasma display.

It is another object of the present invention to provide a near infrared screening film which is inexpensive, has excellent handling properties, high light transmission and the function of preventing the malfunction of peripheral equipment caused by near infrared rays radiated from the screen of a plasma display panel and can be suitably used in the front panel of a luminescent panel display, particularly a plasma display when it is assembled with an electromagnetic shielding thin film laminated film and a laminated film comprising the same.

Other objects and advantages of the present invention will become apparent from the following description.

According to the present invention, firstly, the above objects and advantages of the present invention are attained by a near infrared screening film (may be referred to as "first single-layer film of the present invention" hereinafter) which consists of (A) a biaxially oriented film made from a polyester containing a near infrared light absorber having a weight reduction start temperature of at least 280° C. and which has (B) a haze value of 5% or less, (C) a total transmittance for visible lights having a wavelength of 400 to 650 nm of 40% or more and (D) optical properties at visible and near infrared ranges which satisfy the following expressions (1) to (4):

$$1<T(850)<20 \tag{1}$$

$$1<T(950)<20 \tag{2}$$

$$-10<T(620)-T(540)<10 \tag{3}$$

$$-10<T(450)-T(540)<10 \tag{4}$$

wherein T(450), T(540), T(620), T(850) and T(950) are light transmittances (%) at wavelengths of 450 nm, 540 nm, 620 nm, 850 nm and 950 nm, respectively.

According to the present invention, secondly, the above objects and advantages of the present invention are attained by a near infrared screening film (may be referred to as "second single-layer film of the present invention" hereinafter) which consists of (A) a biaxially oriented film made from a polyester containing a near infrared light absorber having a weight reduction start temperature of at least 280° C. and which has (B) a haze value of 5% or less, (C) a total transmittance for visible lights having a wavelength of 400 to 650 nm of 60% or more and (D) optical properties at visible and near infrared ranges which satisfy the following expressions (5), (6), (7) and (8):

$$5 \leq T(850) \leq 57 \tag{7}$$

$$20 \leq T(950) \tag{8}$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are as defined hereinabove.

According to the present invention, thirdly, the above objects and advantages of the present invention are attained by a near infrared screening laminated film (may be referred to as "laminated film of the present invention" hereinafter) which comprises (A') a biaxially oriented film made from a polyester containing a near infrared light absorber having a weight reduction start temperature of at least 280° C. and an electromagnetic shielding film formed on at least one side of the biaxially oriented film and which has (B) a haze value of 5% or less, (C) a total transmittance for visible lights having a wavelength of 400 to 650 nm of 40% or more, and (D') optical properties at visible and near infrared ranges which satisfy the following expressions (1), (2), (5) and (6):

$$1<T(850)<20 \tag{1}$$

$$1<T(950)<20 \tag{2}$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are as defined hereinabove.

BRIEF DESCRIPTION OF THE DRAWINGS

FIG. 1 is a diagram showing the transmittance of a near infrared film used in Example 2;

FIG. 2 is a diagram showing the transmittance of a near infrared laminated film used in Example 6;

DETAILED DESCRIPTION OF THE PREFERRED EMBODIMENTS

Figure 3:
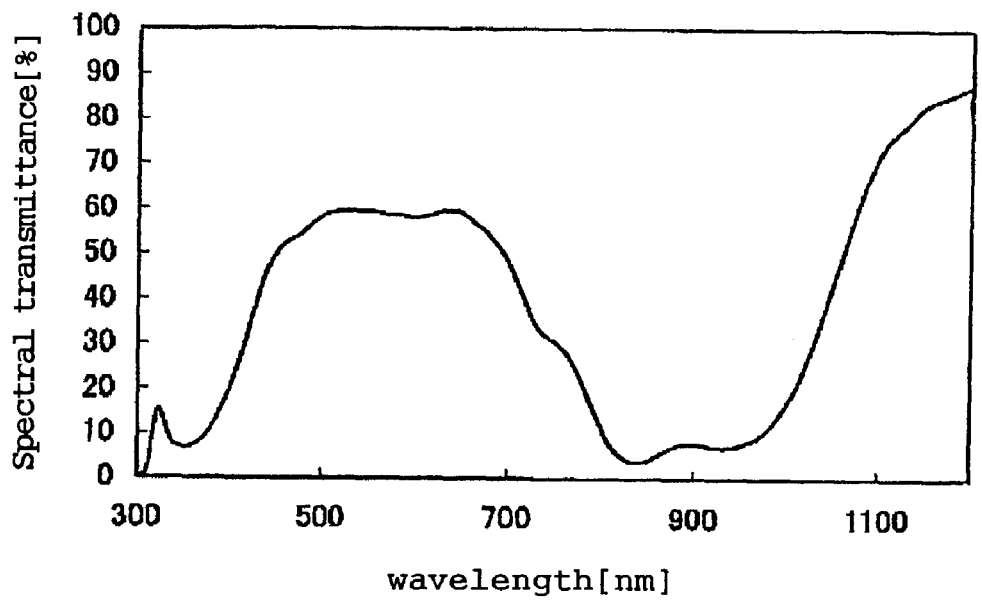
FIG. 3 is a diagram showing the transmittance of a near infrared screening film obtained in Example 9.

The first and second single-layer films of the present invention will be described hereinunder. It should be understood that the following description is common to the first and second single-layer films unless otherwise stated.

Light Transmittance

A description is first given of the first single-layer film.

The near infrared screening film of the present invention has the function of preventing a problem such as the malfunction of peripheral equipment caused by near infrared rays radiated from a plasma display when it is used in the front panel of the plasma display. To this end, the film contains a near infrared light absorber and has transmittances for near infrared rays having wavelengths of 850 nm and 950 nm of 1% to 20%. When the transmittances for near infrared rays having wavelengths of 850 nm and 950 nm are higher than 20%, near infrared rays radiated from the plasma display may not be shielded completely, whereby the peripheral equipment of the plasma display may malfunction. When the transmittances are lower than 1%, the transmittance of visible lights also lowers due to the characteristic properties of the near infrared light absorber, thereby reducing the brightness of the plasma display.

The above near infrared screening film has a total transmittance for visible lights of 40% or more, preferably 40% to 80%. When this total transmittance is lower than 40%, a reduction in the brightness of PDP becomes large with the result of reduced visibility. When the total transmittance is higher than 80%, contrast is lowered by an intermediate color between the luminescent colors of PDP. Therefore, the lower limit of total transmittance is more preferably 50%, particularly preferably 60% and the upper limit thereof is more preferably 70%.

A film containing a near infrared light absorber often sees color nonuniformity due to the characteristic properties of the near infrared light absorber. The near infrared screening film of the present invention suppresses a difference in hue (chroma) as much as possible. In order to suppress the difference in hue, it is effective that the transmittances at wavelengths of red, green and blue rays of PDP should be made almost equal to one another. Therefore, the differences in the transmittance (%) of the film at 450 nm, 540 nm and 620 nm which are the peak wavelengths of blue, green and red rays, that is, (T(450)−T(540)) and (T(620)−T(540)) must be set to a range of −10 to 10%. When the differences in transmittance (%) are outside the above range, radiation from a CRT is greatly colored, thereby reducing visibility. The upper limit of the differences in transmittance (%) is preferably 8%, more preferably 5% and the lower limit thereof is preferably −8%, more preferably −5%.

A description is subsequently given of the second single-layer film.

The near infrared screening film of the present invention consists of a biaxially oriented polyester film which contains a near infrared light absorber and must have a transmittance at a wavelength of 850 nm of 0.05 to 0.57. The transmittance at a wavelength of 850 nm is preferably 0.10 to 0.27. The transmittance at a wavelength of 950 nm is 0.2 or more, preferably 0.20 to 0.55. When the transmittance at a wavelength of 850 nm is higher than 0.57, it is difficult to achieve a transmittance of 0.20 or less after the film is assembled with an electromagnetic shielding thin film laminated film with the result of unsatisfactory near infrared screening ability. When the transmittance at a wavelength of 850 nm is lower than 0.05 or the transmittance at a wavelength of 950 nm is lower than 0.20, a near infrared light absorber is used in an amount more than required, thereby boosting cost. Therefore, there will be no advantage from assembling the film with an electromagnetic shielding thin film laminated film.

The near infrared screening film of the present invention must have a haze value of 5% or less and optical properties at a visible range which satisfy the following expressions (5) and (6):

$$0.7 \leq T(620)/T(540) \leq 1.3 \quad (5)$$

$$0.7 \leq T(450)/T(540) \leq 1.3 \quad (6)$$

wherein T(450), T(540) and T(620) are transmittances at wavelengths of 450 nm, 540 nm and 620 nm, respectively.

This haze value is preferably 3% or less, particularly preferably 2% or less. When this haze value is larger than 5%, the obtained image becomes unclear with a clouded color, thereby reducing visibility. Since R, G and B rays radiated from a plasma display have wavelengths around 620 nm, 540 nm and 450 nm, respectively, when T(620)/T(540) and T(450)/T(540) is 0.7 or less or 1.3 or more, the balance among the brightness's of R, G and B rays is lost, thereby making it impossible to display colors properly. Further, the total transmittance for visible rays (wavelength of 400 to 650 nm) is 60% or more, preferably 70% or more. When the total transmittance is lower than 60%, the entire image becomes dark and power consumption for achieving sufficient brightness becomes larger than required.

Near Infrared Light Absorber

In the present invention, when a near infrared light absorber is contained in the film to increase the absorbance of an infrared wavelength range of the film, it is important that the haze value of the film should not be made large and the haze value of the biaxially oriented film must be set to 5% or less. The content of the near infrared light absorber is preferably 0.10 to 1.00 g/m$^2$ of the plane perpendicular to the thickness direction of the biaxially oriented polyester film. When this haze value is larger than 5%, the obtained image becomes unclear with a clouded color, thereby reducing visibility. As means of maintaining the haze value of the biaxially oriented film at 5% or less and adjusting the transmittances at 850 nm and 950 nm to 20% or less, the near infrared light absorber is preferably dissolved in a polyester which will become a base film or made a dispersant having a particle diameter of 500 nm or less. The haze value of the biaxially oriented film is preferably 3% or less, particularly preferably 2% or less.

In general, near infrared light absorbers have lower thermal stability than that of inorganic pigments. The near infrared light absorber in the present invention must not deteriorate or decompose while it is dissolved in a polyester, or even if it deteriorates or decomposes, its deterioration or decomposition must be small. More specifically, the weight reduction start temperature of the near infrared light absorber must be at least 280° C. Further; the weight reduction rate is preferably 10% or less when the near infrared light absorber is kept at 280° C. for 30 minutes from the viewpoints of the recovery and recycling of a polyester film, particularly a polyethylene terephthalate (PET) film. When the weight reduction rate is 10% or less, a portion which does not become a film product of the polymer can be recovered and used as a film forming raw material again. When the weight reduction rate is larger than 10%, the deterioration or decomposition of the near infrared light absorber proceeds at the time of recovering the film and it is difficult to maintain substantially the same optical properties as a virgin polymer. Further, a near infrared light absorber which rarely reduces the melt viscosity of the polyester at the time of melt extruding the polyester is preferably used from the viewpoint of film productivity.

The near infrared light absorber having the above heat resistance is preferably a compound having a phthalocyanine skeleton or a nickel complex compound. Examples of the near infrared light absorber include the EX812K, EX814K and EX906B near infrared light absorbers of Nippon Shokubai Co., Ltd., the R12 and S13 near infrared light absorbers of Mitsui Chemical, Inc., the IR-ADDITIVE200 near infrared light absorber of Dainippon Ink and Chemicals, Inc., the SDO-1000B near infrared light absorber of Arimoto Kagaku Co., Ltd. and the IRG-023 near infrared light absorber of Nippon Kayaku Co., Ltd. They may be used alone but preferably used in combination of two or more.

Although the near infrared light absorber has poor weatherability, the polyester which will become a base film in the present invention absorbs most of ultraviolet rays unlike an acrylic base film, thereby making it possible to use a near infrared light absorber without worrying about weatherability. An ultraviolet light absorber may be optionally added to the polyester to further improve weatherability.

Addition Method

As for the method of adding the above near infrared light absorber, a predetermined amount of the near infrared light absorber may be dispersed or dissolved in the same glycol as a glycol component of the polyester, such as ethylene glycol, and may be added in the production stage of the polyester. It is preferred from the viewpoints of film productivity, the prevention of inclusion of foreign matter and the simplification of the step that a polyester pellet (master pellet) having a higher content of a near infrared light absorber than its content of the film or a pellet produced by melting and solidifying a near infrared light absorber itself be prepared and added in the film production step. A suitable binder may be used to melt and solidify the near infrared light absorber. As for the addition method, the pellet produced by melting and solidifying a near infrared light absorber is preferably supplied to a film forming step using a small-sized feeder, particularly the extruder of the polyester pellet as the above pellet differs from the polyester pellet which is a film raw material in mechanical properties. The supply by the feeder which is changed by the capacity of the extruder and the amount of addition is preferably 0.2 to 20 kg/h in consideration of the equipment. In order to suppress a reduction in the viscosity of the molten polyester, the residence time is preferably 20 to 4,000 seconds at a shear deformation rate of the extruder of 70 (1/sec). When this value is smaller than 20 seconds, the kneading of the near infrared light absorber is not enough and the film becomes nonuniform in transmittance and when the value is larger than 4,000 seconds, the film is easily broken and the near infrared light absorber is readily thermally decomposed by a reduction in the viscosity of the molten polyester.

As the near infrared screening film of the present invention can reduce the amount of the near infrared light absorber compared with the case where the near infrared light absorber is contained in a coating layer such as a pressure sensitive adhesive layer, color nonuniformity is hardly seen on the plane of the film and a color change caused by a bleed-out of the near infrared light absorber hardly occurs.

Polyester

The polyester for forming the biaxially oriented film of the present invention is a linear saturated polyester synthesized from an aromatic dibasic acid or an ester forming derivative thereof (for example, a lower alkyl ester) and a diol or an ester forming derivative thereof (for example, a lower fatty acid ester, cyclic ether, etc.). Examples of the polyester include polyethylene terephthalate, polyethylene isophthalate, polypropylene terephthalate, polybutylene terephthalate, poly(1,4-cyclohexylene dimethylene terephthalate) and polyethylene-2,6-naphthalene dicarboxylate. Copolymers and blends thereof are also included. Out of these, what comprise 70 wt % or more of ethylene terephthalate or ethylene-2,6-naphthalene dicarboxylate based on the weight of the polyester are preferred, and polyethylene terephthalate comprising ethylene terephthalate as the main recurring unit is particularly preferred from the viewpoints of the workability and transparency of the biaxially oriented film.

As the comonomer of the above polyethylene terephthalate, dicarboxylic acid components include aromatic dicarboxylic acids such as isophthalic acid, phthalic acid and 2,6-naphthalenedicarboxylic acid; aliphatic dicarboxylic acids such as adipic acid, azelaic acid, sebacic acid and decanedicarboxylic acid; and alicyclic dicarboxylic acids such as cyclohexanedicarboxylic acid. Diol components include aliphatic diols such as 1,4-butanediol, 1,6-hexanediol and diethylene glycol; alicyclic diols such as 1,4-cyclohexanedimethanol; and aromatic diols such as bisphenol A. These comonomers may be used alone or in combination of two or more. Out of these comonomers, isophthalic acid is particularly preferred from the viewpoints of workability and transparency.

The amount of the comonomer which changes according to its type is preferably such that the melting point of the polymer does not become lower than 230° C., preferably lower than 240° C. When the melting point of the polymer is lower than 230° C., the polymer may deteriorate in heat resistance and mechanical strength. When the copolyester comprises ethylene terephthalate as the main recurring unit and isophthalic acid as a comonomer, it contains isophthalic acid in an amount of 12 mol % or less based on the total number of moles of all the acid components. The melting point of the polyester is measured by a method for obtaining a melting peak with the 910DSC of DuPont Instruments Co., Ltd. at a temperature elevation rate of 20° C./min. The amount of a sample is 20 mg.

The above polyester can be produced by a method known per se. Preferred examples of the method include one in which terephthalic acid and ethylene glycol and optionally a comonomer (for example, isophthalic acid) are esterified and the obtained reaction product is polycondensed until a targeted polymerization degree is achieved to produce a polyester, and one which terephthalic acid dimethyl ester and ethylene glycol and optionally a comonomer (for example, isophthalic acid dimethyl ester) are subjected to an ester exchange reaction and the obtained reaction product is polycondensed until a targeted polymerization degree is achieved to produce a polyester. As a matter of course, 2,6-naphthalenedicarboxylic acid may be used as the main acid component and 1,4-cyclohexanedimethanol may be used as the main glycol component. The polyester obtained by the above method (melt polymerization) can have a higher degree of polymerization by a polymerization method in a solid-phase state (solid-phase polymerization) as required.

An unstretched film is produced from the thus obtained polyester by a molten film forming method known per se, that is, by melting the polyester and extruding it from a linear die, stretched in biaxial directions and heat set to produce a biaxially oriented film. In general, the stretching temperature is (Tg (glass transition temperature of a polyester)−10) to (Tg+70)° C. and the draw ratio is 2.5 to 8 times in each direction. Preferably, the heat setting temperature is 180 to 250° C. and the heat setting time is 1 to 60 seconds.

The intrinsic viscosity (orthochlorophenol, 35° C.) of the polyester for forming the above biaxially oriented film is preferably 0.45 to 1.50, more preferably 0.48 to 1.00, particularly preferably 0.50 to 0.80. When the intrinsic viscosity is lower than 0.45, film forming properties may become inferior disadvantageously. When the intrinsic viscosity is higher than 1.50, moldability may be impaired, an overload may be imposed on the extruder, or the intrinsic viscosity may be greatly reduced by an overrise in the resin temperature.

In the present invention, additives such as an antioxidant, thermal stabilizer, viscosity modifier, plasticizer, color improving agent, lubricant, nucleating agent, ultraviolet light absorber, antistatic agent, antioxidant and catalyst may be added optionally in the polyester production step or the subsequent step before extrusion from a die.

In the present invention, a substance (filler; lubricant) for roughening the surface of the film is preferably contained in the polyester to improve the traveling properties and slipperiness of the biaxially oriented film. Fillers known as a slipperiness providing agent for a polyester film are used as the filler. Illustrative example of the filler include calcium carbonate, calcium oxide, aluminum oxide, kaolin, silicon oxide, zinc oxide, carbon black, silicon carbide, tin oxide, crosslinked acrylic resin particles, crosslinked polystyrene resin particles, melamine resin particles and crosslinked silicone resin particles. Out of these, porous silica is preferred because it easily provides slipperiness while retaining transparency. The average particle diameter of the filler is preferably 1 to 3 $\mu$m, more preferably 1.2 to 2.4 $\mu$m. The amount of the filler is preferably 0.01 to 0.005 wt %, more preferably 0.008 to 0.006 wt % from the viewpoints of the transparency and slipperiness of the film.

In the present invention, the effect of the near infrared light absorber can be maximized by containing an ultraviolet light absorber in the biaxially oriented film. That is, since a conventional near infrared screening film has the coating layer of a near infrared light absorber on the coating layer of an ultraviolet light absorber, its near infrared screening ability is reduced by the mixing and reaction of the both absorbers. However, as the biaxially oriented film is much thicker than the coating layers, when the ultraviolet light absorber is contained in the biaxially oriented film, the mixing and reaction of the both absorbers can be prevented. Therefore, in the present invention, an ultraviolet light absorber which can be contained in a biaxially oriented film is preferred, and an ultraviolet light absorber which hardly reacts with a near infrared light absorber is more preferred. An ultraviolet light absorber which has both of the above features will be described in more detail.

The above ultraviolet light absorber is preferably at least one cyclic imino ester in an unreacted form selected from the group consisting of a compound represented by the following formula (I):

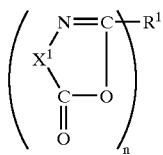
(I)

wherein $X^1$ is a divalent aromatic residue having two bonds at the 1-position and 2-position, n is 1, 2 or 3, and $R^1$ is a hydrocarbon residue having a valence of n which may further contain a hetero atom or may be a direct bond when n is 2, and a compound represented by the following formula (II):

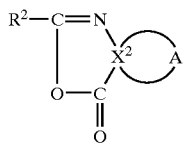
(II)

wherein A is a group represented by the following formula (II)-a:

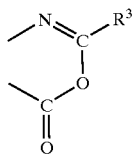
(II)-a or the following formula (II)-b:

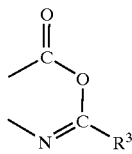
(II)-b $R^2$ and $R^3$ are the same or different and each a monovalent hydrocarbon residue, and $X^2$ is a quadrivalent aromatic residue which may contain a hetero atom.

The cyclic imino ester is a known compound as an ultraviolet light absorber as disclosed in JP-A 59-12952.

Examples of the cyclic imino ester represented by the above formulas (I) and (II) are given below.

Compounds of the Above Formula (I)

When n is 1
2-methyl-3,1-benzooxazin-4-one,
2-butyl-3,1-benzooxazin-4-one,
2-phenyl-3,1-benzooxazin-4-one, 2-(1- or 2-naphthyl)-3,1-benzooxazin-4-one,
2-(4-biphenyl)-3,1-benzooxazin-4-one,
2-p-nitrophenyl-3,1-benzooxazin-4-one,
2-m-nitrophenyl-3,1-benzooxazin-4-one,
2-p-benzoylphenyl-3,1-benzooxazin-4-one,
2-p-methoxyphenyl-3,1-benzooxazin-4-one,
2-o-methoxyphenyl-3,1-benzooxazin-4-one,
2-cyclohexyl-3,1-benzooxazin-4-one, 2-p-(or m-)phthalimidophenyl-3,1-benzooxazin-4-one,
N-phenyl-4-(3,1-benzooxazin-4-on-2-yl)phthalimide,
N-benzoyl-4-(3,1-benzooxazin-4-on-2-yl)aniline,
N-benzoyl-N-methyl-4-(3,1-benzooxazin-4-on-2-yl)aniline,
2-(p-(N-methylcarbonyl)phenyl)-3,1-benzooxazin-4-one When n is 2
2,2'-bis(3,1-benzooxazin-4-one),
2,2'-ethylenebis(3,1-benzooxazin-4-one),
2,2'-tetramethylenebis(3,1-benzooxazin-4-one),
2,2'-decamethylenebis(3,1-benzooxazin-4-one),
2,2'-p-phenylenebis(3,1-benzooxazin-4-one),
2,2'-m-phenylenebis(3,1-benzooxazin-4-one),
2,2'-(4,4'-diphenylene)bis(3,1-benzooxazin-4-one),
2,2'-(2,6- or 1,5-naphthylene)bis(3,1-benzooxazin-4-one),
2,2'-(2-methyl-p-phenylene)bis(3,1-benzooxazin-4-one),
2,2'-(2-nitro-p-phenylene)bis(3,1-benzooxazin-4-one),
2,2'-(2-chloro-p-phenylene)bis(3,1-benzooxazin-4-one),
2,2'-(1,4-cyclohexylene)bis(3,1-benzooxazin-4-one),
N-p-(3,1-benzooxazin-4-on-2-yl)phenyl,
4-(3,1-benzooxazin-4-on-2-yl)phthalimide,
N-p-(3,1-benzooxazin-4-on-2-yl)benzoyl,
4-(3,1-benzooxazin-4-on-2-yl)aniline When n is 3
1,3,5-tri(3,1-benzooxazin-4-on-2-yl)benzene,
1,3,5-tri(3,1-benzooxazin-4-on-2-yl)naphthalene,
2,4,6-tri(3,1-benzooxazin-4-on-2-yl)naphthalene Compounds of the Above Formula (II)
2,8-dimethyl-4H,6H-benzo(1,2-d;5,4-d')bis(1,3)-oxazin-4,6-dione,
2,7-dimethyl-4H,9H-benzo(1,2-d;4,5-d')bis(1,3)oxazin-4,9-dione,
2,8-diphenyl-4H,8H-benzo(1,2-d;5,4-d')bis(1,3)-oxazin-4,6-dione,
2,7-diphenyl-4H,9H-benzo(1,2-d;4,5-d')bis(1,3)-oxazin-4,6-dione, 6,6'-bis(2-methyl-4H,3,1-benzooxazin-4-one),
6,6'-bis(2-ethyl-4H,3,1-benzooxazin-4-one),
6,6'-bis(2-phenyl-4H,3,1-benzooxazin-4-one),
6,6'-methylenebis(2-methyl-4H,3,1-benzooxazin-4-one),
6,6'-methylenebis(2-phenyl-4H,3,1-benzooxazin-4-one),
6,6'-ethylenebis(2-methyl-4H,3,1-benzooxazin-4-one),
6,6'-ethylenebis(2-phenyl-4H,3,1-benzooxazin-4-one),
6,6'-butylenebis(2-methyl-4H,3,1-benzooxazin-4-one),
6,6'-butylenebis(2-phenyl-4H,3,1-benzooxazin-4-one),
6,6'-oxybis(2-methyl-4H,3,1-benzooxazin-4-one),
6,6'-oxybis(2-phenyl-4H,3,1-benzooxazin-4-one),
6,6'-sulfonylbis(2-methyl-4H,3,1-benzooxazin-4-one),
6,6'-sulfonylbis(2-phenyl-4H,3,1-benzooxazin-4-one),
6,6'-carbonylbis(2-methyl-4H,3,1-benzooxazin-4-one),
6,6'-carbonylbis(2-phenyl-4H,3,1-benzooxazin-4-one),
7,7'-methylenebis(2-methyl-4H,3,1-benzooxazin-4-one),
7,7'-methylenebis(2-phenyl-4H,3,1-benzooxazin-4-one),
7,7'-bis(2-methyl-4H,3,1-benzooxazin-4-one),
7,7'-ethylenebis(2-methyl-4H,3,1-benzooxazin-4-one),
7,7'-oxybis(2-methyl-4H,3,1-benzooxazin-4-one),
7,7'-sulfonylbis(2-methyl-4H,3,1-benzooxazin-4-one),
7,7'-carbonylbis(2-methyl-4H,3,1-benzooxazin-4-one), 6,7'-bis(2-methyl-4H,3,1-benzooxazin-4-one),
6,7'-bis(2-phenyl-4H,3,1-benzooxazin-4-one),
6,7'-methylenebis(2-methyl-4H,3,1-benzooxazin-4-one),
6,7'-methylenebis(2-phenyl-4H,3,1-benzooxazin-4-one)

Out of the above compounds, compounds of the above formula (I) are preferred, compounds of the above formula (I) in which n is 2 are more preferred, and compounds represented by the following formula (I)-1 are particularly preferred:

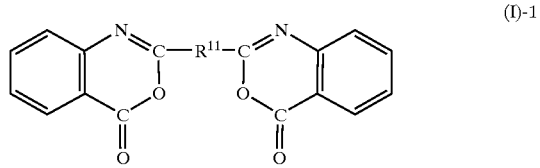

(I)-1 wherein $R^{11}$ is a divalent aromatic hydrocarbon residue.

Out of the compounds represented by the above formula (I)-1, 2,2'-p-phenylenebis(3,1-benzooxazin-4-one), 2,2'-(4,4'-diphenylene)bis(3,1-benzooxazin-4-one) and 2,2'-(2,6-naphthylene)bis(3,1-benzooxazin-4-one) are preferred.

The amount of the above ultraviolet light absorber is preferably 0.1 to 5 wt %, more preferably 0.2 to 3 wt % based on the polyester. When the amount is smaller than 0.1 wt %, the effect of preventing deterioration by ultraviolet rays is small and when the amount is larger than 5 wt %, the film forming properties of the polyester deteriorate disadvantageously. The ultraviolet light absorber is preferably added during the polymerization or melt extrusion of the polyester. At this point, the ultraviolet light absorber can be formed as a master pellet and then be added, which is preferred.

The thickness of the biaxially oriented film of the present invention is preferably 50 μm or more because it can suppress the scattering of glass when PDP is broken. The upper limit of thickness of the biaxially oriented film is preferably 250 μm from the viewpoints of ease of maintaining the haze value at 5% or less and film productivity.

Adhesive Layer

The biaxially oriented polyester film of the present invention preferably comprises an adhesive layer formed on at least one side thereof to improve adhesion to a hard coat layer and a pressure sensitive adhesive layer which will be described hereinafter and workability. This adhesive layer can be formed by applying an aqueous coating fluid which comprises a polyester resin, acrylic resin or mixture thereof and wax to the biaxially oriented polyester film and drying it during the production process of the biaxially oriented film.

The above aqueous polyester resin is, for example, an aqueous polyester resin which comprises the following polybasic acid component and polyol component. Examples of the polybasic acid component include terephthalic acid, isophthailc acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimeric acid and 5-sodiumsulfoisophthalic acid. A copolyester resin is preferably synthesized from two or more of the above acid components. A trace amount of a hydroxycarboxylic acid such as maleic acid, itaconic acid or p-hydroxybenzoic acid as an unsaturated polybasic acid component may also be used. Examples of the polyol component include ethylene glycol, 1,4-butanediol, diethylene glycol, dipropylene glycol, 1,6-hexanediol, 1,4-cyclohexanedimethanol, xylene glycol, dimethylolpropane, poly(ethylene oxide)glycol and poly(tetramethylene oxide)glycol. The present is not limited to these monomers.

The aqueous polyester resin can be produced from a polybasic acid or ester forming derivative thereof (for example, dimethyl ester, acid anhydride, etc.) and a polyol or ester forming derivative thereof (for example, lower fatty acid ester, cyclic anhydride, etc.) by a conventionally known polymerization method.

The above aqueous acrylic resin can be obtained by copolymerizing the following acrylic monomer. Examples of the acrylic monomer include alkyl acrylates and alkyl methacrylates (examples of the alkyl group include methyl group, ethyl group, n-propyl group, isopropyl group, n-butyl group, isobutyl group, t-butyl group, 2-ethylhexyl group and cyclohexyl group); hydroxy group-containing monomers such as 2-hydroxyethyl acrylate, 2-hydroxyethyl methacrylate, 2-hydroxypropyl acrylate and 2-hydroxypropyl methacrylate; epoxy group-containing monomers such as glycidyl acrylate, glycidyl methacrylate and allyl glycidyl ether; monomers containing a carboxy group or a salt thereof such as acrylic acid, methacrylic acid, itaconic acid, maleic acid, fumaric acid, crotonic acid, styrenesulfonic acid and salts thereof (sodium salts, potassium salts, ammonium salts, tertiary amine salts, etc.); monomers containing an amido group such as acrylamide, methacrylamide, N-alkylacrylamide, N-alkylmethacrylamide, N,N-dialkylacrylamide, N,N-dialkylmethacrylates (examples of the alkyl group include methyl group, ethyl group, n-propyl group, isopropyl group, n-butyl group, isobutyl group, t-butyl group, 2-ethylhexyl group and cyclohexyl group), N-alkoxyacrylamide, N-alkoxymethacrylamide, N,N-dialkoxyacrylamide, N,N-dialkoxymethacrylamide (examples of the alkoxy group include methoxy group, ethoxy group, butoxy group and isobutoxy group), acryloylmorpholine, N-methylolacrylamide, N-methylolmethacrylamide, N-phenylacrylamide and N-phenylmethacrylamide; acid anhydride monomers such as maleic anhydride and itaconic anhydride; and other monomers such as vinyl isocyanate, allyl isocyanate, styrene, α-methylstyrene, vinylmethyl ether, vinylethyl ether, vinyltrialkoxysilane, alkylmaleic acid monoester, alkylfumaric acid monoester, alkylitaconic acid monoester, acrylonitrile, methacrylonitrile, vinylidene chloride, ethylene, propylene, vinyl chloride, vinyl acetate and butadiene. The present invention is not limited to these monomers.

Examples of the above wax include vegetable waxes such as carnauba wax, candelilla wax, rice wax, haze wax, Jojoba oil, palm wax, rosin-modified wax, urucury wax, cane wax, esparto wax and bark wax, animal waxes such as beeswax, lanoline, whale wax, insect wax and shellac wax, mineral waxes such as montan wax, ozokerite and ceresine wax, petroleum waxes such as paraffin wax, micro-crystalline wax and petrolactam, and synthetic hydrocarbon-based waxes such as Fischer-Tropsch, polyethylene wax, polyethylene oxide wax, polypropylene wax and polypropylene oxide wax. Out of these, carnauba wax, paraffin wax and polyethylene wax are preferred because they have excellent adhesion to a hard coat and a self-adhesive and high lubricity. Further, a water dispersion thereof is more preferred from the viewpoints of an environmental problem and handling ease.

The polyester resin for forming a coating layer is contained in the coating layer in an amount of preferably 50 to 95 wt %, more preferably 60 to 90 wt %. Another resin for forming the coating layer (for example, an acrylic resin) is contained in the coating layer in an amount of preferably 5 to 30 wt %, more preferably 10 to 25 wt %. When the amount of the polyester resin is larger than 95 wt % or the amount of the acrylic resin is smaller than 5 wt %, adhesion may become unsatisfactory. When the amount of the acrylic resin is larger than 30 wt %, the transparency of the coating layer may lower because the acrylic resin is not compatible with the polyester resin. Wax is preferably contained in the coating layer in an amount of 0.5 to 20 wt %. The amount is more preferably 1 to 10 wt %. When the amount of the wax is smaller than 0.5 wt %, the lubricity of the surface of the film may not be obtained. When the amount is larger than 20 wt %, close adhesion to a polyester base film or adhesion to a hard coat and a self-adhesive may become unsatisfactory.

The above composition is preferably used in the form of an aqueous coating fluid such as an aqueous solution, water dispersion or emulsion to form a coating film. To form the coating film, resins other than the above composition, such as a polymer having an oxazoline group, crosslinking agent such as melamine, epoxy or aziridine, antistatic agent, colorant, surfactant, ultraviolet light absorber and lubricant (filler) may be optionally added. Particularly, lubricity and antiblock properties can be further improved by adding a lubricant.

The solids content of the aqueous coating fluid is preferably 20 wt % or less, more preferably 1 to 10 wt %. When the content is lower than 1 wt %, coatability on the polyester film becomes unsatisfactory and when the content is higher than 20 wt %, the stability of the coating agent and the appearance of a coat may deteriorate.

The aqueous coating fluid may be applied to the polyester film in any stage but preferably in the production step of the polyester film, more preferably to the polyester film before the orientation of crystals is completed.

The polyester film before the orientation of crystals is completed is an unstretched film, a monoaxially stretched film obtained by stretching an unstretched film in a longitudinal or transverse direction or a biaxially oriented film obtained by stretching an unstretched film in both longitudinal and transverse directions at a low draw ratio (or a biaxially oriented film obtained by stretching the biaxially oriented film in a longitudinal or transverse direction again before the orientation of crystals is completed).

Preferably, the aqueous coating fluid of the above composition is applied to the unstretched film or monoaxially stretched film and then the film is stretched in a longitudinal direction and/or transverse direction and heat set.

In order to apply the coating fluid to the film, preferably, the surface of the film is subjected to a physical pre-treatment such as a corona surface treatment, flame treatment or plasma treatment, or the composition is used in combination with a surfactant which is chemically inactive with the composition to improve coatability.

Examples of the surfactant which improves the wettability of the polyester film by the aqueous coating fluid include anionic and nonionic surfactants such as polyoxyethylene alkylphenyl ethers, polyoxyethylene-fatty acid esters, sorbitan fatty acid esters, glycerin fatty acid esters, fatty acid metal soap, alkylsulfuric acid salts, alkylsulfonic acid salts and alkylsulfosuccinic acid salts. The surfactant is preferably contained in the composition for forming a coating film in an amount of 1 to 10 wt %.

The coating weight of the coating fluid is such that the thickness of the coating film becomes preferably 0.02 to 0.3 $\mu$m, more preferably 0.07 to 0.25 $\mu$m. When the thickness of the coating film is too small, adhesive force becomes unsatisfactory and when the thickness is too large, blocking may occur or the haze value may become large.

Known coating techniques may be used. For example, roll coating, gravure coating, roll brushing, spray coating, air knife coating, impregnation and curtain coating may be used alone or in combination. The coating film may be formed on only one side or both sides of the film.

Hard Coat Layer

A near infrared screening film laminate can be produced by forming the above adhesive layer on both sides of the near infrared screening film of the present invention, a hard coat layer on one of the adhesive layers and a second adhesive layer on the other adhesive layer.

The material of the above hard coat layer is not limited to a particular resin if it becomes hard enough to stand practical use, as exemplified by ionizing radiation curable resins, thermosetting resins and thermoplastic resins. It is preferably an ionizing radiation curable resin which facilitates the work of forming a film on a base film and easily increases its pencil hardness to a desired value.

The ionizing radiation curable resin used to form the hard coat layer is preferably a resin having an acrylate-based functional group, particularly preferably a polyester acrylate or urethane acrylate. The above polyester acrylate is an acrylate and/or methacrylate of an oligomer of a polyester-based polyol (the acrylate and methacrylate will be generally referred to as "(meth)acrylate" hereinafter). The above urethane acrylate is an acrylate of an oligomer of a polyol compound and a diisocyanate compound. The monomer for forming the acrylate is selected from methyl (meth)acrylate, ethyl (meth)acrylate, butyl (meth)acrylate, 2-ethylhexyl (meth)acrylate, methoxyethyl (meth)acrylate, butoxyethyl (meth)acrylate and phenyl (meth)acrylate.

To further enhance the hardness of the hard coat layer, a polyfunctional monomer is preferably used. Preferred examples of the polyfunctional monomer include trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate and neopentyl glycol di(meth)acrylate.

Examples of the polyester-based oligomer used to form the hard coat layer include condensates of adipic acid or sebacic acid as an acid component and a glycol (for example, ethylene glycol, polyethylene glycol, propylene glycol, butylene glycol, polybutylene glycol, etc.) or triol (for example, glycerin, trimethylolpropane, etc.), and condensates obtained by condensing a triol component with these, such as polyadipate triol and poly(polyolsebacate). Part or all of the above aliphatic dicarboxylic acid may be substituted by another organic acid. In this case, the another organic acid is preferably isophthalic acid, terephthalic acid or phthalic anhydride because it provides high hardness to the hard coat layer.

The polyurethane-based oligomer used to form the hard coat layer is obtained from a condensate of a polyisocyanate and a polyol. Examples of the polyisocyanate include methylene•bis(p-phenylenediisocyanate), hexamethylene diisocyanate•hexanetriol adduct, hexamethylene diisocyanate, tolylene diisocyanate, tolylene diisocyanate•trimethylolpropane adduct, 1,5-naphthylene diisocyanate, thiopropyl diisocyanate, ethylbenzene-2,4-diisocyanate, 2,4-tolylene diisocyanate dimmer, hydrogenated xylylene diisocyanate and tris(4-phenylisocyanate)thiophosphate. Examples of the polyol include polyether-based polyols such as polyoxytetramethylene glycol, polyester-based polyols such as polyadipate polyol and polycarbonate polyol, and copolymers of an acrylic acid ester and hydroxyethyl methacrylate.

Further, when an ultraviolet curable resin is used as the above ionizing radiation curable resin, a photopolymerization initiator such as an acetophenone, benzophenone, Michler benzoyl benzoate, α-amyloxime ester or thioxanthone and an optical sensitizer such as n-butylamine, triethylamine or tri-n-butylphosphine are preferably mixed into the resin.

The above urethane acrylate has high elasticity and flexibility and excellent workability (folding endurance) but its surface hardness tends to be unsatisfactory, thereby making it difficult to obtain a pencil hardness of 2H or more. In contrast to this, a polyester acrylate makes it possible to form a hard coat layer having extremely high hardness by selecting the constituent components of a polyester. Then, a hard coat layer comprising 60 to 90 parts by weight of an urethane acrylate and 40 to 10 parts by weight of a polyester acrylate is preferred because it has both high hardness and flexibility.

The coating fluid used to form the hard coat layer preferably contains inert fine particles having a secondary particle diameter of 20 $\mu$m or less in an amount of 0.3 to 3 parts by weight based on 100 parts by weight of the resin component to adjust gloss and provide surface slipperiness (not releasability). When the amount of the fine particles is smaller than 0.3 part by weight, the effect of improving slipperiness becomes unsatisfactory and when the amount is larger than 3 parts by weight, the pencil hardness of the obtained hard coat layer may lower. Preferred examples of the inert fine particles to be added to the coating fluid include inorganic fine particles such as silica, magnesium carbonate, aluminum hydroxide and barium sulfate, and organic polymer fine particles such as polycarbonate, acrylic resin, polyimide, polyamide, polyethylene naphthalate and melamine resin.

The coating technique for forming the hard coat layer is suitably selected from conventional techniques known per se according to the characteristic properties and coating weight of the coating fluid, such as roll coating, gravure coating, bar coating and extrusion coating. The thickness of the hard coat layer is not particularly limited but preferably 1 to 15 $\mu$m.

Antireflection Layer

The antireflection layer of the near infrared screening film laminate of the present invention is formed on the surface of the hard coat layer. Preferably, it is a laminate formed by alternately laminating together a plurality of layers having different refractive indices and its structure is generally known. Examples of the laminate include a laminate consisting of two antireflection layers formed by sol-gel wet coating, a laminate consisting of three antireflection layers formed by sputtering and a combination thereof formed to achieve high cost efficiency and performance.

The above antireflection layer is not particularly limited if it does not impair the above optical properties of the near infrared screening film laminate. Examples of the antireflection layer include (1) an antireflection layer composed of an $MgF_2$ extremely thin film having a thickness of about 0.1 $\mu$m, (2) an antireflection layer composed of a metal deposited film, (3) an antireflection layer made from a material having a lower refractive index than that of the hard coat layer and formed on the hard coat layer, (4) an antireflection layer laminate consisting of a high refractive index layer formed on the hard coat layer and a low refractive index layer having a lower refractive index than the high refractive index layer formed on the high refractive index layer (for example, a layer of super fine particles of a metal oxide having a high refractive index formed in a portion in contact with the hard coat layer of the antireflection layer), (5) an antireflection layer laminate formed by alternately laminating together a plurality of the antireflection layers (4) and (6) an antireflection layer laminate consisting of a high refractive index layer, an intermediate refractive index layer having a lower refractive index than the high refractive index layer on the inner side (on the screen side when the film is assembled with the screen) of the high refractive index layer and a low refractive index layer having a lower refractive index than the intermediate refractive index layer on the outer side (side opposite to the screen side when the film is assembled with the screen) of the high refractive index layer.

Out of these, an antireflection layer laminate consisting of an intermediate refractive index layer, a high refractive index layer and a low refractive index layer formed on the hard coat layer on the base film 1 in the mentioned order is preferred because it can prevent reflection more effectively. An antireflection layer laminate consisting of a low refractive index layer having a refractive index of more than 1.4 and a thickness of 80 to 110 nm, an intermediate refractive index layer having a thickness of 50 to 100 nm and a high refractive index layer having a refractive index of less than 2.2 and a thickness of 30 to 110 nm, all of which are made from SiOx and have an optical thickness D (D=n·d, n; refractive index of the intermediate refractive index layer, d: thickness of the intermediate refractive index layer) smaller than the wavelength of visible light is more preferred.

The above antireflection layer of the near infrared screening film laminate of the present invention can suppress the reflection of extraneous light which impairs the visibility of a display. There is also available an antireflection single layer which prevents the reflection of a yellow ray mainly. However, an antireflection multi-layer film is suitable for the prevention of reflection of a display.

Second Adhesive Layer

The near infrared screening film laminate of the present invention has a second adhesive layer on the side opposite to the hard coat layer side. When the second adhesive layer is to be laminated with the biaxially oriented film, it is preferred to laminate it with the film through the above adhesive layer to improve adhesion to the biaxially oriented film.

It is desired that the second adhesive layer should have re-releasability, should leave no paste after it is removed and should not peel off or form air bubbles in a forced aging test at a high temperature and a high humidity. The second adhesive having the above properties is suitably selected from acrylic, rubber-based, polyvinyl ether-based and silicone-based adhesives. Acrylic adhesives are the most preferred. The acrylic adhesives are obtained by copolymerizing an alkyl (meth)acrylic acid ester with a polymerizable unsaturated carboxylic acid or hydroxyl group-containing ethylenically unsaturated monomer and further a copolymerizable vinyl-based monomer in an organic solvent or water medium. Polymerization is preferably radical polymerization. Solution polymerization, suspension polymerization or emulsion polymerization is preferably used.

The number average molecular weight measured by gel permeation chromatography of the above copolymer is 9,500 to 950,000, preferably 50,000 to 500,000, more preferably 95,000 to 400,000. When the number average molecular weight is lower than 9,500, it is difficult to form a uniform resin composition layer and when the number average molecular weight is higher than 950,000, the elasticity becomes high and it is difficult to adjust the coating weight.

The above alkyl (meth)acrylic acid ester is preferably methyl (meth)acrylate, butyl (meth)acrylate or octyl (meth) acrylate having an alkyl group with 1 to 12 carbon atoms. Specific examples of the alkyl methacrylate include methyl methacrylate, ethyl methacrylate, n-propyl methacrylate, isopropyl methacrylate, n-hexyl methacrylate, cyclohexyl methacrylate, 2-ethylhexyl methacrylate, n-octyl methacrylate, isooctyl methacrylate and lauryl methacrylate. Specific examples of the alkyl acrylate include methyl acrylate, ethyl acrylate, propyl acrylate, butyl acrylate, n-hexyl acrylate, 2-ethylhexyl acrylate, n-octyl acrylate and lauryl acrylate. They may be used alone or in combination of two or more.

The second adhesive may be mixed with a crosslinking agent. The amount of the crosslinking agent is generally 0.01 to 10 parts by weight based on 100 parts by weight of the acrylic adhesive. Examples of the crosslinking agent include isocyanate-based compounds, aluminum chelate, aziridinyl-based compounds and epoxy-based compounds. The second adhesive is applied to a base film with a coater such as a roll coater, reverse coater, comma coater, lip coater or die coater as an organic solvent solution. A film or paper which has been subjected to a release treatment is laminated with the base film on the adhesive layer side to improve handling ease.

The near infrared screening film having the above laminate structure on the first single-layer film can be directly assembled with the glass substrate of a plasma display before use. The plasma display device comprising this near infrared screening film has excellent visibility and abrasion resistance and absorbs near infrared rays radiated from the inside of PDP, thereby causing no trouble in a peripheral remote control unit.

Preferably, the second single-layer film is assembled with an electromagnetic shielding thin film laminated film to prevent a problem such as the malfunction of peripheral equipment caused by near infrared rays radiated from a plasma display panel and the resulting laminated film is used on the front panel of a plasma display device. The transmittances at 850 nm and 950 nm out of the near infrared wavelength range of the laminated film must be 0.01 or more and 0.20 or less. They are preferably 0.1 or less. When the transmittances for near infrared rays having wavelengths of 850 nm and 950 nm are higher than 0.20, near infrared rays radiated from the plasma display panel cannot be shielded completely, whereby the malfunction of plasma display peripheral equipment may occur. When the transmittances are lower than 0.01, the transmittance for visible rays lowers and the brightness of the plasma display deteriorates according to the characteristic properties of the near infrared light absorber.

The above electromagnetic shielding thin film laminated film preferably comprises an electromagnetic shielding transparent conducive layer on at least one side of a transparent base film. This transparent conductive layer is composed of a Sb-doped $SnO_2$ or Sn-doped $In_2O_3$ (ITO) semiconductor thin film having a wide optical band gap and a high free electron density, or an Au, Ag, Cu or Al film. Out of these, an Ag film is particularly preferred because it rarely absorbs visible rays. Two or more metal substances may be used in combination as required. The method of forming the metal layer is preferably vapor deposition, more preferably sputtering, vacuum deposition or plasma CVD. The thickness of the metal layer must be set to achieve a visible light transmittance of 70% or more and a near infrared screening ratio of 40% or more. The thickness of the metal layer is preferably 5 to 1,000 nm. When the thickness is smaller than 5 nm, the surface resistance becomes high and a satisfactory electromagnetic shielding effect is not obtained and when the thickness is larger than 1,000 nm, the visible light transmittance lowers with the result of deteriorated transparency.

A transparent dielectric layer having a high refractive index is preferably formed on the above electromagnetic shielding thin film laminated film to suppress the reflection of visible rays and improve transparency. The dielectric is $TiO_2$, $ZrO_2$, $SnO_2$ or $In_2O_3$. $TiO_2$ or $ZrO_2$ derived from an organic compound obtained by hydrolyzing an alkyl titanate or alkyl zirconium is preferred because they have excellent workability. In addition, an indium oxide or tin oxide single-layer or multi-layer may also be used as the dielectric layer. The method of forming the dielectric layer is preferably vapor-phase deposition, more preferably sputtering, vacuum deposition or plasma CVD. The above metal layer is preferably sandwiched by the dielectric layers to increase the effect of transparency. The thickness of the dielectric layer must be set together with that of the above metal layer to achieve the optical properties of the structure of the present invention. The thickness of the dielectric layer is 0 to 750 nm, preferably 10 to 500 nm.

The above transparent base film is preferably a biaxially oriented polyester film having a thickness of 25 to 250 $\mu$m, preferably 25 to 175 $\mu$m. The polyester for forming this biaxially oriented film may be identical to the polyester of the biaxially oriented film constituting the near infrared screening film. The biaxial orientation heat treatment conditions may be the same as those of the biaxially oriented film.

The laminated film obtained by assembling the second single-layer film with the electromagnetic shielding thin film laminated film in the present invention may comprise a metal mesh between the second single-layer film and the electromagnetic shielding thin film laminated film to improve electromagnetic shielding properties.

A description is subsequently given of the laminated film of the present invention.

As for what is not described of the laminated film of the present invention, it should be understood that the description of the above single-layer film is applied directly or with modifications obvious to one of ordinary skill in the art.

The laminated film of the present invention comprises a biaxially oriented film made from a polyester which contains a near infrared light absorber having a weight reduction start temperature of at least 280° C. and an electromagnetic shielding film formed on at least one side of the biaxially oriented film.

The near infrared light absorber having a weight reduction start temperature of at least 280° C. and the biaxially oriented film made from the polyester containing the above absorber are as described above in the section of single-layer film, and the electromagnetic shielding film formed on at least one side of the biaxially oriented film is as described above in the section of the second single-layer film.

Preferably, the above biaxially oriented film of the laminated film has a haze value of 5% or less and optical properties at visible and near infrared ranges which satisfy the following expressions (5), (6), (7) and (8):

$$5 \leq T(850) \leq 57 \quad (7)$$

$$20 \leq T(950) \quad (8)$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are as defined hereinabove.

The optical properties at visible and near infrared ranges of the above biaxially oriented film preferably satisfy the following expressions (7)-1 and (8)-1:

$$10 \leq T(850) \leq 28 \tag{7-1}$$

$$20 \leq T(950) \leq 55 \tag{8-1}$$

wherein T(850) and T(950) are as defined hereinabove.

The total transmittance for visible rays having a wavelength of 400 to 650 nm of the above biaxially oriented film is particularly preferably 60% or more.

The above laminated film of the present invention has a haze value of 5% or less, a total transmittance for visible rays having a wavelength of 400 to 650 nm of 40% or more and optical properties at visible and near infrared ranges which satisfy the following expressions (5), (6), (7) and (8):

$$5 \leq T(850) \leq 5 \tag{7}$$

$$20 \leq T(950) \tag{8}$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are as defined hereinabove.

The electromagnetic shielding film of the laminated film of the present invention is the same as that described for the second single-layer film. It is particularly preferably formed of the transparent base film and an electromagnetic shielding transparent conductive film formed on at least one side thereof.

The laminated film of the present invention is advantageously used as a film consisting of the laminated film and an adhesive layer formed on at least one side of the laminated film, a film consisting of the laminated film, an adhesive layer formed on both sides of the laminated film, a hard coat layer formed on one of the adhesive layers and a second adhesive layer formed on the other adhesive layer, and preferably as a film which further comprises an antireflection layer laminate consisting of at least two thin layers having different refractive indices on the surface of the hard coat layer, like the above single-layer film.

EXAMPLES

The following examples are given to further illustrate the present invention. Characteristic property values in examples were evaluated by the following methods.

(1) Total Light Transmittance and Haze Value

The total light transmittance Tt (%) and the scattered light transmittance Td (%) were measured with the haze measuring instrument (NDH-20) of Nippon Denshoku Kogyosha Co., Ltd. in accordance with JIS K6714-1958.

The obtained total light transmittance was evaluated based on the following criteria. Level 2 or more means that the total light transmittance has no problem with practical use and level 3 means that the total light transmittance is extremely excellent.

3: total light transmittance of 60% or more
2: total light transmittance of 40% or more and less than 60%
1: total light transmittance of less than 40%

The haze (%) was calculated from the measured total light transmittance Tt(%) and scattered light transmittance Td (%) according to the following expression.

$$\text{Haze }(\%) = (Td/Tt) \times 100$$

The obtained haze value was evaluated based on the following criteria.

4: haze value ≤ 2.0%; haze value is very small and the film can be used practically extremely well
3: 2.0% < haze value ≤ 3.0%; haze value is small and the film can be used practically well
2: 3.0% < haze value ≤ 5.0%; haze value is a little small and there is no problem with practical use
1: 5.0% < haze value; haze value is large and there is a problem with practical use (2) Light Transmittance at a Wavelength of 400 to 1,500 nm and Optical Density The transmittance at a wavelength of 400 to 1,500 nm was measured with the MPC3100 spectrophotometer of Shimadzu Corporation.

(3) Difference in Hue

L*, a* and b* in an L*a*b* display system were obtained from the transmission spectrum for standard light A of a sample film in accordance with JIS standard Z8729 and ab chroma (C*ab) was calculated from the following expression. The difference between chroma and achroma was evaluated from the obtained C*ab based on the following criteria.

⊚: C*ab is less than 10
○: C*ab is 10 or more and less than 20
X: C*ab is 20 or less $$C^*ab = ((a^*)^2 + (b^*)^2)^{1/2}$$

(4) Evaluation of Color Nonuniformity

The transmittance at 550 nm was measured at 20 sites selected at random from 1 m² of a-sample with the MPC3100 spectrophotometer of Shimadzu Corporation. A value (R: %) obtained by dividing the difference between the maximum value and the minimum value of transmittance by the average value was calculated to be evaluated as follows.

○: R (%) is 5% or less; absolutely no problem with use of PDP and not judged as color nonuniformity
Δ: R (%) is more than 5% and 10% or less; judged as color nonuniformity when observed closely
X: R (%) is more than 10%; can be recognized as color nonuniformity at the time of using PDP and a single-color image looks partly tinted with another color (5) Abrasion Resistance of Near Infrared Screening Film The abrasion resistance of the sample was evaluated from the difference in haze value (Δ haze) before and after an abrasion test (load of 1 kg, 50 round trips) made by a reciprocating abrasion tester by mounting steel wool #000 on a square pad (area of 6.25 cm²) as follows.

Δ haze = (haze value after abrasion test) − (haze value before abrasion test)

○: Δ haze is less than 10
Δ: Δ haze is 10 or more and less than 20
X: Δ haze is 20 or more (6) Adhesive Force a. To Adhesive The sample was kept in a thermo-hygrostat maintained at 60° C. and 80% RH for 24 hours, the pressure sensitive adhesive layer of the sample was assembled with a glass plate, and the adhesive force of the sample was evaluated by a stripping test based on the following criteria.

⊚: adhesive force is so high that the base film is broken
○: the sample peels off but has practical utility value
X: the sample easily peels off and has no practical utility value b. To Hard Coat Cross cuts were made into the hard coat layer of the sample having no antireflection layer to form 100 squares (size: 1 mm×1 mm) and a 24 mm wide cellophane tape was affixed to the layer and stripped off quickly at a peel angle of 180°. The surface of the hard coat layer from which the tape was stripped off was observed to evaluate the adhesive force based on the following criteria.

5: total removed area is less than 10%; extremely high adhesive force
4: total removed area is 10% or more and less than 20%; high adhesive force
3: total removed area is 20% or more and less than 30%; moderate adhesive force
2: total removed area is 30% or more and less than 40%; low adhesive force
1: total removed area is more than 40%; extremely low adhesive force (7) Near Infrared Screening Ability The obtained multi-layer film was placed on the light receiving section of a remote control unit for a home TV and remote control signals (signal wavelengths of 950 nm and 850 nm) were sent by the remote control unit from 2 m away from the TV to test if the home TV responds to the signals.

Since near infrared rays from the PDP display are weaker than near infrared rays from the remote control unit, if no response is observed in this test, the prevention of an interference with the remote control unit is possible.

When the TV does not respond to the remote control unit, near infrared screening ability is evaluated as ○ and when the TV responds to the remote control unit, near infrared screening ability is evaluated as X.

Example 1

Molten polyethylene terephthalate (PET, [η]=0.65) containing 0.05 wt % of the EX814K near infrared light absorber of Nippon Shokubai Co., Ltd., 0.05 wt % of the EX812K near infrared light absorber of Nippon Shokubai Co., Ltd. and 0.007 wt % of porous silica having an average particle diameter of 1.7 μm was extruded from a die and cooled on a cooling drum by a commonly used method to obtain an unstretched film. This unstretched film was stretched to 3.5 times in a longitudinal direction at 90° C. Thereafter, an aqueous solution containing 8% of the following coating composition was uniformly applied to both sides of the stretched film with a roll coater, and then the resulting laminate was stretched to 3.8 times in a transverse direction at 120° C. while it was dried at 95° C. and heat set at 230° C. to obtain a near infrared screening film having a thickness of 188 μm. The thickness of the adhesive layer was 0.15 μm. The evaluation results of the obtained film are shown in Table 1.

| Coating composition | |
|---|---|
| Copolyester having a Tg of 68° C. synthesized from terephthalic acid (90 mol %), isophthalic acid (6 mol %) and potassium 5-sulfoisophthalate (4 mol %) as acid components and ethylene glycol (95 mol %) and neopentyl glycol (5 mol %) as glycol components | 80 wt % |
| N,N'-ethylenebiscaprylic acid amide | 5 wt % |
| Acrylic resin fine particle (average particle diameter of 0.03 μm) | 10 wt % |
| Polyoxyethylene nonylphenyl ether | 5 wt % |

Examples 2 and 3

The procedure of Example 1 was repeated except that the near infrared light absorber was changed as shown in Table 1. The evaluation results of the obtained films are shown in Table 1. The transmittance of the film used in Example 2 is shown in FIG. 1.

Example 4

Molten polyethylene-2,6-naphthalene dicarboxylate (PEN, [η]=0.65) containing 0.05 wt % of the EX814K near infrared light absorber of Nippon Shokubai Co., Ltd., 0.05 wt % of the EX812K near infrared light absorber of Nippon Shokubai Co., Ltd. and 0.007 wt % of porous silica having an average particle diameter of 1.7 μm was extruded from a die and cooled on a cooling drum by a commonly used method to obtain an unstretched film. This unstretched film was stretched to 3.5 times in a longitudinal direction at 130° C. Thereafter, an aqueous solution containing 8% of the following coating composition was uniformly applied to both sides of the stretched film with a roll coater, and then the resulting laminate was stretched to 3.8 times in a transverse direction at 120° C. while it was dried at 145° C. and heat set at 230° C. to obtain a near infrared screening film having a thickness of 188 μm. The thickness of the adhesive coating film was 0.15 μm. The evaluation results of the obtained film are shown in Table 1.

| Coating composition | |
|---|---|
| Copolyester having a Tg of 68° C. synthesized from terephthalic acid (90 mol %), isophthalic acid (6 mol %) and potassium 5-sulfoisophthalate (4 mol %) as acid components and ethylene glycol (95 mol %) and neopentyl glycol (5 mol %) as glycol components | 80 wt % |
| N,N'-ethylenebiscaprylic acid amide | 5 wt % |
| Acrylic resin fine particle (average particle diameter of 0.03 μm) | 10 wt % |
| Polyoxyethylene nonylphenyl ether | 5 wt % |

Comparative Example 1

The procedure of Example 1 was repeated except that no near infrared light absorber was used. The evaluation results of the obtained film are shown in Table 1. The film had no near infrared light absorptivity.

Comparative Examples 2 and 3

The procedure of Example 1 was repeated except that the near infrared light absorber was changed as shown in Table 1. The evaluation results of the obtained films are shown in Table 1. Comparative Example 2 had no problem with near infrared light absorptivity but had a low total light transmittance.

TABLE 1

| | polyester | absorber 1 (wt %) | absorber 2 (wt %) | amount of absorber (g/m$^2$) | T (850) (%) | T (900) (%) |
|---|---|---|---|---|---|---|
| Ex. 1 | PET | A (0.05) | B (0.05) | 0.03 | 33 | 40 |
| Ex. 2 | PET | C (0.08) | — | 0.024 | 12 | 14 |
| Ex. 3 | PET | A (0.05) | — | 0.015 | 47 | 82 |
| Ex. 4 | PEN | C (0.05) | — | 0.015 | 38 | 40 |
| C. Ex. 1 | PET | None | None | 0 | 0 | 90 |
| C. Ex. 2 | PET | A (0.4) | B (0.4) | 0.24 | 2.7 | 0.1 |
| C. Ex. 3 | PET | A (0.01) | B (0.01) | 0.006 | 61 | 62 |

| | T (950) (%) | total light transmittance | haze | difference in hue | near infrared screening ability 850 | 950 |
|---|---|---|---|---|---|---|
| Ex. 1 | 72 | 3 | 4 | ⊚ | X | X |
| Ex. 2 | 40 | 3 | 4 | ○ | ○ | X |
| Ex. 3 | 89 | 3 | 4 | ○ | X | X |
| Ex. 4 | 61 | 3 | 4 | ⊚ | X | X |
| C. Ex. 1 | 90 | 3 | 4 | ⊚ | X | X |
| C. Ex. 2 | 0.3 | 1 | 3 | X | ○ | ○ |
| C. Ex. 3 | 67 | 3 | 4 | ⊚ | X | X |

Ex. = Example,
C. Ex. = Comparative Example

Letters in Table 1 signify the following (the same shall apply to Table 2).
A: EX814K near infrared light absorber of Nippon Shokubai Co., Ltd.
B: EX812K near infrared light absorber of Nippon Shokubai Co., Ltd.
C: IR-ADDITIVE200 near infrared light absorber of Dainippon and Ink Chemicals, Inc.
D: KAYASORB IRG-023 of Nippon Kayaku Co., Ltd.

Example 5

A UV curable composition having the following composition was uniformly applied to the adhesive coating film formed on one side of the near infrared screening film of Example 1 with a roll coater to ensure that the thickness of the cured film became 5 μm.

| UV curable composition | |
|---|---|
| Pentaerythritol acrylate | 45 wt % |
| N-methylolacrylamide | 40 wt % |
| N-vinylpyrrolidone | 10 wt % |
| 1-hydroxycyclohexylphenyl ketone | 5 wt % |

Thereafter, the obtained coating film was cured by exposure to ultraviolet radiation from a high-pressure mercury lamp having an intensity of 80 W/cm for 30 seconds to form a hard coat layer.

Then, an antireflection layer laminate consisting of a low refractive index layer (SiO$_2$, 30 nm), a high refractive index layer (TiO$_2$, 30 nm), a low refractive index layer (SiO$_2$, 30 nm), a high refractive index layer (TiO$_2$, 100 nm) and a low refractive index layer (SiO$_2$, 100 nm) formed in the mentioned order was formed on the hard coat layer by sputtering.

Subsequently, an adhesive coating solution a (adhesive content of 20 wt %) prepared by the following method was uniformly stirred and applied to a 38 μm-thick PET film subjected to a release treatment so as to ensure that the thickness of the dried adhesive layer became 25 μm, and dried. The resulting laminate was assembled with a 188 μm-thick transparent PET film subjected to the above antireflection treatment in such a manner that the adhesive layer was placed on the untreated side of the PET film to obtain the near infrared screening film (laminated film) of the present invention.

The thus obtained laminated film was assembled with an electromagnetic shielding thin film laminated film coated with an adhesive on one side (manufactured by Teijin Shoji Co., Ltd., trade name: Reftel XIR-70). The optical properties of the obtained laminate and the evaluation results of the obtained display device are shown in Table 2.

Preparation of Adhesive Coating Solution a

A solution having the following composition was prepared in a flask equipped with a thermometer, stirrer, reduction cooling tube and nitrogen feed pipe.

| Composition of acrylic solution | |
|---|---|
| n-butyl acrylate | 47.0 wt % |
| acrylic acid | 3.0 wt % |
| benzoyl peroxide | 0.2 wt % |
| ethyl acetate | 20.0 wt % |
| toluene | 29.8 wt % |

After nitrogen was introduced from the nitrogen feed pipe to create a nitrogen atmosphere in the flask, a polymerization reaction was carried out by heating at 65° C. for 10 hours to obtain an acrylic polymer solution having a weight average molecular weight of about 1,200,000 (number average molecular weight of about 300,000) and a Tg of about −49° C. Ethyl acetate was added to this acrylic polymer solution to ensure that the solid content of this acrylic polymer solution became 20 wt % so as to obtain an acrylic polymer solution for a master batch. 0.1 part by weight of N,N,N', N'-tetraglycidyl-m-xylenediamine was added to 100 parts (solid content) by weight of this solution to obtain the adhesive coating solution a.

Examples 6 to 8

The procedure of Example 5 was repeated except that the films used in Examples 2 to 4 were used. The evaluation results of the obtained laminated films are shown in Table 2. The transmittance of the laminated film used in Example 6 (before it was assembled with an electromagnetic shielding thin film laminated film) is shown in FIG. 2.

Comparative Example 4

The procedure of Example 5 was repeated except that the film obtained in Example 1 was changed to the film obtained in Comparative Example 1. The evaluation results of the obtained laminated film are shown in Table 2. The obtained film did not show satisfactory near infrared screening ability at a wavelength of 850 nm.

Comparative Example 5

The procedure of Example 5 was repeated except that the film obtained in Example 1 was changed to the film obtained in Comparative Example 3. The evaluation results of the obtained laminated film are shown in Table 2. The obtained film did not show satisfactory near infrared screening ability at a wavelength of 850 nm.

Comparative Example 6

A UV curable composition having the following composition was uniformly applied to the coating film formed on one side of the polyester film of Comparative Example 1 with a roll coater to ensure that the thickness of the cured film became 5 μm.

| UV curable composition | |
|---|---|
| Pentaerythritol acrylate | 45 wt % |
| N-methylolacrylamide | 40 wt % |
| N-vinylpyrrolidone | 10 wt % |
| 1-hydroxycyclohexylphenyl ketone | 5 wt % |

Thereafter, the obtained coating film was cured by exposure to ultraviolet radiation from a high-pressure mercury lamp having an intensity of 80 W/cm for 30 seconds to form a hard coat layer.

Then, an antireflection layer laminate consisting of a low refractive index layer ($SiO_2$, 30 nm), a high refractive index layer ($TiO_2$, 30 nm), a low refractive index layer ($SiO_2$, 30 nm), a high refractive index layer ($TiO_2$, 100 nm) and a low refractive index layer ($SiO_2$, 100 nm) formed in the mentioned order was formed on the above hard coat layer by sputtering. Subsequently, an adhesive coating solution a (adhesive content of 20 wt %) prepared by the following method was uniformly stirred and applied to a 38 μm-thick PET film subjected to a release treatment to ensure that the thickness of the dried adhesive layer became 25 μm and dried. The resulting laminate was assembled with a 188 μm-thick transparent PET film subjected to the above anti-reflection treatment in such a manner that the adhesive layer was placed on the untreated side of the PET film to obtain a laminated film. The evaluation results of the thus obtained laminated film and display device are shown in Table 2. Although the laminated film showed satisfactory near infrared screening ability, the amount of the near infrared light absorber was large, thus boosting cost and adhesion between the adhesive layer and the film was poor.

Preparation of Adhesive Coating Solution b

A solution having the following composition was prepared in a flask equipped with a thermometer, stirrer, reduction cooling tube and nitrogen feed pipe.

| Composition of acrylic solution | |
|---|---|
| n-butyl acrylate | 47.0 wt % |
| acrylic acid | 3.0 wt % |
| benzoyl peroxide | 0.2 wt % |
| ethyl acetate | 20.0 wt % |
| toluene | 29.6 wt % |
| IR-Additive200 near infrared light absorber of Dainippon and Ink Chemicals, Inc. | 0.4 wt % |

After nitrogen was introduced from the nitrogen feed pipe to create a nitrogen atmosphere in the flask, a polymerization reaction was carried out by heating at 65° C. for 10 hours to obtain an acrylic polymer solution having a weight average molecular weight of about 1,200,000 (number average molecular weight of about 300,000) and a Tg of about −49° C. Ethyl acetate was added to this acrylic polymer solution to ensure that the solid content of this acrylic polymer solution became 20 wt % so as to obtain an acrylic polymer solution for a master batch. 0.1 part by weight of N,N,N', N'-tetraglycidyl-m-xylylenediamine was added to 100 parts (solid content) by weight of this solution to obtain the adhesive coating solution b.

Comparative Example 7

The procedure of Comparative Example 2 was repeated except that the near infrared light absorber to be added to the adhesive coating solution b was changed as shown in Table 2 and the thickness of the adhesive layer was changed to 45 μm. The evaluation results of the obtained laminated film are shown in Table 2. Although the laminated film showed satisfactory near infrared screening ability, the amount of the near infrared light absorber was large, thus boosting cost and adhesion between the adhesive layer and the transparent base film was poor.

TABLE 2

| | base film | antistatic metal film multi-layer laminate | adhesive layer thickness of adhesive (μm) | absorber 1 (wt %) | absorber 2 (wt %) | amount of absorber (g/m$^2$) | near infrared light transmittance of laminate T800 (%) | T900 (%) | T950 (%) |
|---|---|---|---|---|---|---|---|---|---|
| Ex. 5 | Ex. 1 | Existent | 25 | — | — | (0.030) | 13 | 11 | 12 |
| Ex. 6 | Ex. 2 | Existent | 25 | — | — | (0.024) | 9 | 7 | 9 |
| Ex. 7 | Ex. 3 | Existent | 25 | — | — | (0.015) | 17 | 22 | 18 |
| Ex. 8 | Ex. 4 | Existent | 25 | — | — | (0.015) | 12 | 11 | 12 |
| C. Ex. 4 | C. Ex. 1 | Existent | 25 | — | — | 0.000 | 35 | 25 | 18 |
| C. Ex. 5 | C. Ex. 3 | Existent | 25 | — | — | (0.006) | 29 | 22 | 14 |
| C. Ex. 6 | C. Ex. 1 | Non-existent | 45 | C (0.4) | — | 0.029 | 12 | 14 | 40 |
| C. Ex. 7 | C. Ex. 1 | Non-existent | 45 | A (0.4) | D (0.4) | 0.058 | 11 | 13 | 18 |

TABLE 2-continued

| | adhesive force | | near infrared screening ability | | haze | total light transmittance | difference in hue | surface reflection | abrasion resistance |
|---|---|---|---|---|---|---|---|---|---|
| | to adhesive | to hard coat | 850 | 950 | | | | | |
| Ex. 5 | ◎ | 5 | ○ | ○ | 4 | 4 | ○ | ◎ | excellent |
| Ex. 6 | ◎ | 5 | ○ | ○ | 4 | 3 | ◎ | ◎ | excellent |
| Ex. 7 | ◎ | 5 | ○ | ○ | 4 | 3 | ◎ | ◎ | excellent |
| Ex. 8 | ◎ | 5 | ○ | ○ | 4 | 4 | ○ | ◎ | excellent |
| C. Ex. 4 | ○ | 5 | X | ○ | 4 | 3 | ◎ | ◎ | excellent |
| C. Ex. 5 | X | 5 | X | ○ | 3 | 2 | ○ | ◎ | excellent |
| C. Ex. 6 | X | 5 | ○ | X | 4 | 2 | X | ◎ | excellent |
| C. Ex. 7 | X | 5 | ○ | ○ | 4 | 2 | ○ | ◎ | excellent |

Ex. = Example,
C. Ex. = Comparative Example

Example 9

Molten polyethylene terephthalate (PET, [η]=0.65) containing 0.40 wt % of the EX814K near infrared light absorber of Nippon Shokubai Co., Ltd., 0.20 wt % of the S13 near infrared light absorber of Mitsui Chemical, Inc. and 0.007 wt % of porous silica having an average particle diameter of 1.7 μm was extruded from a die and cooled on a cooling drum by a commonly used method to obtain an unstretched film which was then stretched to 3.5 times in a longitudinal direction at 90° C. Thereafter, an aqueous solution containing 8% of the following coating composition was uniformly applied to both sides of the stretched film with a roll coater, and then the resulting laminate was stretched to 3.8 times in a transverse direction at 120° C. while it was dried at 95° C. and heat set at 230° C. to obtain a near infrared screening biaxially oriented film having a thickness of 75 μm. The thickness of the adhesive layer was 0.15 μm. The evaluation results of the obtained film are shown in Table 3. The transmittance of the film is shown in FIG. 3.

| Coating composition | |
|---|---|
| Copolyester resin having a Tg of 68° C. synthesized from terephthalic acid (90 mol %), isophthalic acid (6 mol %) and potassium 5-sulfoisophthalate (4 mol %) as acid components and ethylene glycol (95 mol %) and neopentyl glycol (5 mol %) as glycol components | 80 wt % |
| N,N'-ethylenebiscaprylic acid amide | 5 wt % |
| Acrylic resin fine particle (average particle diameter of 0.03 μm) | 10 wt % |
| Polyoxyethylene nonylphenyl ether | 5 wt % |

Examples 10 to 13

Figure 4:
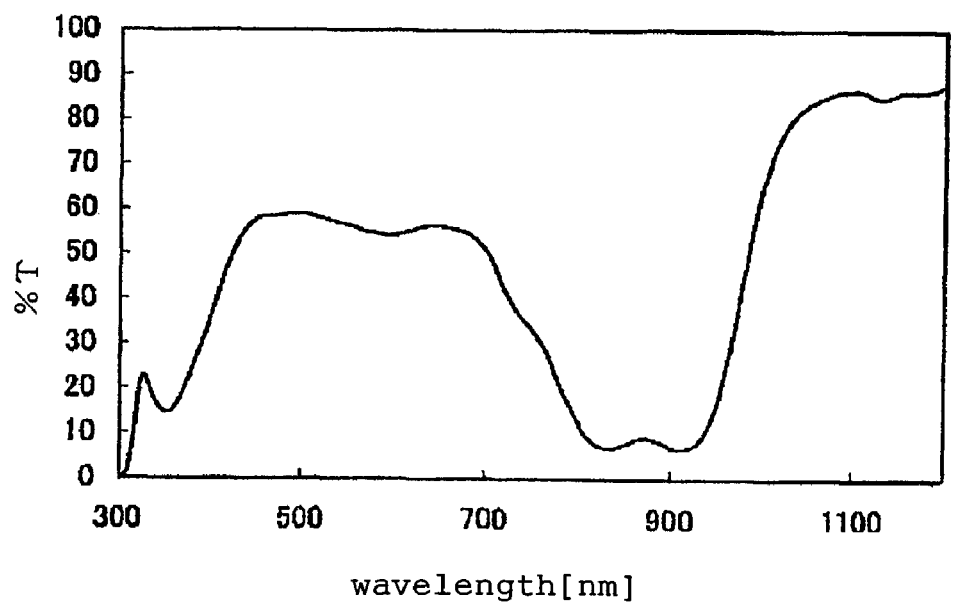
FIG. 4 is a diagram showing the transmittance of a near infrared screening film obtained in Example 11.

The procedure of Example 9 was repeated except that the near infrared light absorber was changed as shown in Table 3. The evaluation results of the obtained near infrared screening films are shown in Table 3. The transmittance of the film obtained in Example 11 is shown in FIG. 4.

Example 14

Molten polyethylene-2,6-naphthalene dicarboxylate (PEN, [η]=0.65) containing 0.40 wt % of the EX814K near infrared light absorber of Nippon Shokubai Co., Ltd., 0.20 wt % of the S13 near infrared light absorber of Mitsui Chemical, Inc. and 0.007 wt % of porous silica having an average particle diameter of 1.7 μm was extruded from a die and cooled on a cooling drum by a commonly used method to obtain an unstretched film which was then stretched to 3.5 times in a longitudinal direction at 130° C. Thereafter, an aqueous solution containing 8% of the following coating composition was uniformly applied to both sides of the stretched film with a roll coater, and then the resulting laminate was stretched to 3.8 times in a transverse direction at 120° C. while it was dried at 145° C. and heat set at 230° C. to obtain a near infrared screening film having a thickness of 75 μm. The thickness of the adhesive layer was 0.15 μm. The evaluation results of the obtained film are shown in Table 3.

| Coating composition | |
|---|---|
| Copolyester resin having a Tg of 68° C. synthesized from terephthalic acid (90 mol %), isophthalic acid (6 mol %) and potassium 5-sulfoisophthalate (4 mol %) as acid components and ethylene glycol (95 mol %) and neopentyl glycol (5 mol %) as glycol components | 80 wt % |
| N,N'-ethylenebiscaprylic acid amide | 5 wt % |
| Acrylic resin fine particle (average particle diameter of 0.03 μm) | 10 wt % |
| Polyoxyethylene nonylphenyl ether | 5 wt % |

Comparative Example 8

The procedure of Example 9 was repeated except that no near infrared light absorber was used. The evaluation results of the obtained biaxially oriented film are shown in Table 3. The obtained film had no near infrared absorptivity.

Comparative Examples 9 to 12

The procedure of Example 9 was repeated except that the near infrared light absorber was changed as shown in Table 3. The evaluation results of the obtained near infrared screening films are shown in Table 3. The film of Comparative Example 9 had no problem with near infrared absorptivity but a low total light transmittance. The film of Comparative Example 10 had unsatisfactory near infrared absorptivity.

TABLE 3

|  | polyester | near infrared light absorber type | near infrared light absorber (weight) | weight reduction start temperature | amount of near infrared light absorber (g/m²) | T(620) − T(540) | T(450) − T(540) | T(850) (%) |
|---|---|---|---|---|---|---|---|---|
| Ex. 9 | PET | E | 0.60% | >300° C. | 0.70 | −0.6 | −9.0 | 11.2 |
| Ex. 10 | PET | F | 0.47% | >300° C. | 0.56 | −0.7 | −6.6 | 5.6 |
| Ex. 11 | PET | G | 0.67% | 282° C. | 0.80 | −1.1 | 1.5 | 12.7 |
| Ex. 12 | PEN | H | 0.47% | >300° C. | 0.56 | −3.4 | −6.2 | 12.4 |
| Ex. 13 | PET | I | 0.40% | 280° C. | 0.48 | −0.9 | −8.8 | 12.7 |
| Ex. 14 | PEN | E | 0.60% | >300° C. | 0.72 | −0.6 | −9.0 | 11.2 |
| C. Ex. 8 | PET | None | 0.00% | — | 0.00 | 0.2 | −0.7 | 91.0 |
| C. Ex. 9 | PET | J | 0.33% | 230° C. | 0.40 | 1.0 | 3.3 | 18.4 |
| C. Ex. 10 | PET | K | 0.35% | >300° C. | 0.42 | 0.6 | 1.1 | 32.3 |
| C. Ex. 11 | PET | L | 1.00% | 280° C. | 1.20 | −4.5 | −12.5 | 0.4 |
| C. Ex. 12 | PET | M | 0.40% | 220° C. | 0.48 | −1.3 | −4.5 | 6.3 |

|  | T(900) (%) | T(950) (%) | total light transmittance (%) | haze (%) | difference in hue | color nonuniformity | color heat resistance upon recovery of raw materials | near infrared screening ability 850 | near infrared screening ability 950 |
|---|---|---|---|---|---|---|---|---|---|
| Ex. 9 | 4.2 | 7.8 | 52 | 4 | ○ | ○ | ◎ | ○ | ○ |
| Ex. 10 | 3.1 | 10.1 | 61 | 4 | ○ | ○ | ◎ | ○ | ○ |
| Ex. 11 | 17.4 | 18.7 | 51 | 4 | ◎ | ○ | ○ | ○ | ○ |
| Ex. 12 | 11.0 | 14.9 | 52 | 4 | ○ | ○ | ○ | ○ | ○ |
| Ex. 13 | 17.4 | 18.7 | 51 | 4 | ○ | ○ | ○ | ○ | ○ |
| Ex. 14 | 4.2 | 7.8 | 52 | 4 | ○ | ○ | ◎ | ○ | ○ |
| C. Ex. 8 | 91.0 | 91.0 | 90 | 4 | ◎ | — | — | X | X |
| C. Ex. 9 | 68.6 | 85.0 | 72 | 4 | ◎ | ○ | ◎ | ○ | X |
| C. Ex. 10 | 35.3 | 43.2 | 73 | 4 | ◎ | ○ | X | X | X |
| C. Ex. 11 | 1.0 | 11.9 | 34 | 3 | X | ○ | X | ○ | ○ |
| C. Ex. 12 | 4.2 | 4.1 | 34 | 3 | X | ○ | X | ○ | ○ |

Ex. = Example,
C. Ex. = Comparative Example

Letters E to M in Table 3 represent the types and amounts of the following near infrared light absorbers (wt % after mixed with a polyester).

E: EX814K near infrared light absorber of Nippon Shokubai Co., Ltd. (0.40 wt %) and S13 near infrared light absorber of Mitsui Chemical, Inc. (0.20 wt %)

F: EX812K near infrared light absorber of Nippon Shokubai Co., Ltd. (0.07 wt %), EX814K (0.27 wt %) and S13 near infrared light absorber of Mitsui Chemical, Co., Ltd. (0.27 wt %)

G: EX812K near infrared light absorber of Nippon Shokubai Co., Ltd. (0.13 wt %) EX814K (0.27 wt %) and EX906B near infrared light absorber of Nippon Shokubai Co., Ltd. (0.27 wt %)

H: EX906B near infrared light absorber of Nippon Shokubai Co., Ltd. (0.27 wt %) and R12 near infrared light absorber of Mitsui Chemical, Inc. (0.20 wt %)

I: EX814K near infrared light absorber of Nippon Shokubai Co., Ltd. (0.20 wt %) and S13 near infrared light absorber of Mitsui Chemical, Inc. (0.13 wt %)

J: EX814K near infrared light absorber of Nippon Shokubai Co., Ltd. (0.33 wt %)

K: IRG-023 near infrared light absorber of Nippon Kayaku Co., Ltd. (0.15 wt %) and EX814K near infrared light absorber of Nippon Shokubai Co., Ltd. (0.20 wt %)

L: IR-ADDITIVE200 near infrared light absorber of Dainippon and Ink Chemicals, Inc. (1.00 wt %)

M: SDO-1000B near infrared light absorber of Arimoto Kagaku Co., Ltd. (0.20 wt %) and IR-ADDITIVE200 near infrared light absorber of Dainippon and Ink Chemicals, Inc. (0.20 wt %)

Example 15

The same UV curable composition as in Example 5 was uniformly applied to one side of the near infrared screening film obtained in Example 9 with a roller coater to ensure that the thickness of the cured coating film became 5 μm.

Thereafter, the obtained coating film was cured by exposure to ultraviolet radiation from a high-pressure mercury lamp having an intensity of 80 W/cm for 30 seconds to form a hard coat layer.

An antireflection layer laminate consisting of a low refractive index layer ($SiO_2$, 30 nm), a high refractive index layer ($TiO_2$, 30 nm), a low refractive index layer ($SiO_2$, 30 nm), a high refractive index layer ($TiO_2$, 100 nm) and a low refractive index layer ($SiO_2$, 100 nm) formed in the mentioned order was formed on the above hard coat layer by sputtering.

Subsequently, an adhesive coating solution c (adhesive content of 20 wt %) prepared by the following method was uniformly stirred and applied to a 38 μm-thick polyethylene terephthalate (PET) film subjected to a release treatment to ensure that the thickness of the dried adhesive layer became 25 μm and dried. The resulting laminate was assembled with a 75 μm-thick near infrared screening film subjected to the above antireflection treatment in such a manner that the adhesive layer was placed on the untreated side of the film to obtain the near infrared screening laminated film of the present invention. The evaluation results of the thus obtained laminated film and display device are shown in Table 4.

Preparation of Adhesive Coating Solution c

A solution having the following composition was prepared in a flask equipped with a thermometer, stirrer, reduction cooling tube and nitrogen feed pipe.

| Composition of acrylic solution | |
|---|---|
| n-butyl acrylate | 47.0 wt % |
| acrylic acid | 3.0 wt % |
| benzoyl peroxide | 0.2 wt % |
| ethyl acetate | 20.0 wt % |
| toluene | 29.8 wt % |
| EX814K near infrared light absorber of Nippon Shokubai Co., Ltd. | 0.1 wt % |
| EX907B near infrared light absorber of Nippon Shokubai Co., Ltd. | 0.1 wt % |

After nitrogen was introduced from the nitrogen feed pipe to create a nitrogen atmosphere in the flask, a polymerization reaction was carried out by heating at 65° C. for 10 hours to obtain an acrylic polymer solution having a weight average molecular weight of about 1,200,000 (number average molecular weight of about 300,000) and a Tg of about −49° C. Ethyl acetate was added to this acrylic polymer solution to ensure that the solid content of this acrylic polymer solution became 20 wt % so as to obtain an acrylic polymer solution for a master batch. 0.1 part by weight of N,N,N', N'-tetraglycidyl-m-xylylenediamine was added to 100 parts (solid content) by weight of this solution to obtain the adhesive coating solution c.

Examples 16 to 20

The procedure of Example 15 was repeated except that the near infrared screening films obtained in Examples 10 to 14 were used. The evaluation results of the obtained laminated films are shown in Table 4.

Comparative Example 13

The same UV curable composition as in Comparative Example 6 was uniformly applied to the coating film on one side of the biaxially oriented polyester film of Comparative Example 8 with a roller coater to ensure that the thickness of the cured coating film became 5 μm.

Thereafter, the obtained coating film was cured by exposure to ultraviolet radiation from a high-pressure mercury lamp having an intensity of 80 W/cm for 30 seconds to form a hard coat layer.

An antireflection layer laminate consisting of a low refractive index layer (SiO₂, 30 nm), a high refractive index layer (TiO₂, 30 nm), a low refractive index layer (SiO₂, 30 nm), a high refractive index layer (TiO₂, 100 nm) and a low refractive index layer (SiO₂, 100 nm) formed in the mentioned order was formed on the above hard coat layer by sputtering. Subsequently, an adhesive coating solution d (adhesive content of 20 wt %) prepared by the following method was uniformly stirred and applied to a 38 μm-thick PET film subjected to a release treatment to ensure that the thickness of the dried adhesive layer became 25 μm and dried. The resulting laminate was assembled with a 75 μm-thick near infrared screening film subjected to the above antireflection treatment in such a manner that the adhesive layer was placed on the untreated side of the film to obtain a near infrared screening laminated film. The evaluation results of the thus obtained laminated film and display device are shown in Table 4. This laminated film did not show satisfactory near infrared screening ability.

Preparation of Adhesive Coating Solution d

A solution having the following composition was prepared in a flask equipped with a thermometer, stirrer, reduction cooling tube and nitrogen feed pipe.

| Composition of acrylic solution | |
|---|---|
| n-butyl acrylate | 47.0 wt % |
| acrylic acid | 3.0 wt % |
| benzoyl peroxide | 0.2 wt % |
| ethyl acetate | 20.0 wt % |
| toluene | 29.6 wt % |
| EX814K near infrared light absorber of Nippon Shokubai Co., Ltd. | 0.1 wt % |
| EX907B near infrared light absorber of Nippon Shokubai Co., Ltd. | 0.1 wt % |

After nitrogen was introduced from the nitrogen feed pipe to create a nitrogen atmosphere in the flask, a polymerization reaction was carried out by heating at 65° C. for 10 hours to obtain an acrylic polymer solution having a weight average molecular weight of about 1,200,000 (number average molecular weight of about 300,000) and a Tg of about −49° C. Ethyl acetate was added to this acrylic polymer solution to ensure that the solid content of this acrylic polymer solution became 20 wt % so as to obtain an acrylic polymer solution for a master batch. 0.1 part by weight of N,N,N', N'-tetraglycidyl-m-xylenediamine was added to 100 parts (solid content) by weight of this solution to obtain the adhesive coating solution d.

Comparative Examples 14 to 16

The procedure of Comparative Example 9 was repeated except that the near infrared light absorber to be added to the adhesive coating solution d was changed as shown in Table 4 and the thickness of the adhesive layer was changed to 45 μm. The evaluation results of the obtained near infrared screening laminated films are shown in Table 4. The films had low adhesive force between the adhesive layer and a base film.

TABLE 4

| | base film | adhesive layer | | | evaluation of color nonuniformity | adhesive force | |
|---|---|---|---|---|---|---|---|
| | | layer thickness (μm) | near infrared light absorber | | | to adhesive | to hard coat |
| | | | Type and amount (wt %) | (g/m²) | | | |
| Ex. 15 | Ex. 9 | 25 | — | — | ○ | ⊙ | 5 |
| Ex. 16 | Ex. 10 | 25 | — | — | ○ | ⊙ | 5 |
| Ex. 17 | Ex. 11 | 25 | — | — | ○ | ⊙ | 5 |
| Ex. 18 | Ex. 12 | 25 | — | — | ○ | ⊙ | 5 |
| Ex. 19 | Ex. 13 | 25 | — | — | ○ | ⊙ | 5 |
| Ex. 20 | Ex. 14 | 25 | — | — | ○ | ⊙ | 5 |
| C. Ex. 13 | C. Ex. 8 | 25 | N(1.80) | 2.16 | X | ○ | 5 |
| C. Ex. 14 | C. Ex. 9 | 45 | O(0.78) | 0.92 | Δ | X | 5 |
| C. Ex. 15 | C. Ex. 9 | 45 | P(0.88) | 1.06 | Δ | X | 5 |
| C. Ex. 16 | C. Ex. 9 | 45 | Q(0.35) | 0.42 | Δ | X | 5 |

| | near infrared screening ability | | haze (%) | total light transmittance (%) | difference in hue | surface reflection | abrasion resistance |
|---|---|---|---|---|---|---|---|
| | 850 | 950 | | | | | |
| Ex. 15 | ○ | ○ | 4 | 52 | ○ | ⊙ | ○ |
| Ex. 16 | ○ | ○ | 4 | 61 | ○ | ⊙ | ○ |
| Ex. 17 | ○ | ○ | 4 | 51 | ○ | ⊙ | ○ |
| Ex. 18 | ○ | ○ | 4 | 52 | ○ | ⊙ | ○ |
| Ex. 19 | ○ | ○ | 4 | 51 | ○ | ⊙ | ○ |
| Ex. 20 | ○ | ○ | 4 | 52 | ○ | ⊙ | ○ |
| C. Ex. 13 | ○ | ○ | 4 | 86 | ○ | ⊙ | ○ |
| C. Ex. 14 | ○ | ○ | 3 | 75 | ○ | ⊙ | ○ |
| C. Ex. 15 | ○ | ○ | 3 | 63 | ○ | ⊙ | ○ |
| C. Ex. 16 | ○ | ○ | 3 | 50 | ○ | ⊙ | ○ |

Ex. = Example,
C. Ex. = Comparative Example

Letters N to Q in Table 4 represent the following.
N: EX814K near infrared light absorber of Nippon Shokubai Co., Ltd. (1.20 wt %) and S13 near infrared light absorber of Mitsui Chemical, Inc.(0.60 wt %)
O: EX812K (0.11 wt %) and EX814K (0.44 wt %) near infrared light absorbers of Nippon Shokubai Co., Ltd. and S13 near infrared light absorber of Mitsui Chemical, Inc.(0.22 wt %)
P: SDO-1000B near infrared light absorber of Arimoto Kagaku Co., Ltd. (0.44 wt %) and IR-ADDITIVE200 near infrared light absorber of Dainippon and Ink Chemicals, Inc.(0.44 wt %)
Q: IRG-023 near infrared light absorber of Nippon Kayaku Co., Ltd. (0.44 wt %) and EX814K near infrared light absorber of Nippon Shokubai Co., Ltd.(0.33 wt %)

What is claimed is:

1. A near infrared screening film which consists of (A) a biaxially oriented film made from a polyester containing a near infrared light absorber having a weight reduction start temperature of at least 280° C. and a weight change rate of 10 wt % or less when it is kept at 280° C. for 30 minutes and which has (B) a haze value of 5% or less, (C) a total transmittance for visible lights having a wavelength of 400 to 650 nm of 40% or more and (D) optical properties at visible and near infrared ranges which satisfy the following expressions (1) to (4):

$$1 < T(850) < 20 \tag{1}$$

$$1 < T(950) < 20 \tag{2}$$

$$-10 < T(620) - T(540) < 10 \tag{3}$$

$$-10 < T(450) - T(540) < 10 \tag{4}$$

wherein T(450), T(540), T(620), T(850) and T(950) are light transmittances at wavelengths of 450 nm, 540 nm, 620 nm, 850 nm and 950 nm, respectively.

2. The film of claim 1, wherein the near infrared light absorber is contained in an amount of 0.10 to 1.00 g per 1 m² of a plane perpendicular to the thickness direction of the biaxially oriented film.

3. The film of claim 1, wherein the near infrared light absorber is a compound having a phthalocyanine skeleton or a nickel complex compound.

4. A film comprising the near infrared screening film of claim 1 and an adhesive layer formed on at least one side of the film.

5. A film comprising the near infrared screening film of claim 1, an adhesive layer formed on both sides of the film, a hard coat layer formed on one of the adhesive layers and a second adhesive layer formed on the other adhesive layer.

6. The film of claim 5 which further comprises an antireflection layer laminate consisting of at least two thin layers having different refractive indices on the hard coat layer.

7. A near infrared screening laminated film which comprises (A') a biaxially oriented film made from a polyester containing a near infrared light absorber having a weight reduction start temperature of at least 280° C., a weight change rate of 10 wt % or less when it is kept at 280° C. for 30 minutes and an electromagnetic shielding film formed on at least one side of the biaxially oriented film, and which has (B) a haze value of 5% or less, (C) a total transmittance for visible lights having a wavelength of 400 to 650 nm of 40% or more, and (D') optical properties at visible and near infrared ranges which satisfy the following expressions (1), (2), (5) and (6):

$$1 < T(850) < 20 \tag{1}$$

$$1 < T(950) < 20 \tag{2}$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are light transmittances at wavelengths of 450 nm, 540 nm, 620 nm, 850 nm and 950 nm, respectively.

8. The laminated film of claim 7, wherein the total transmittance for visible rays having a wavelength of 400 to 650 nm of the biaxially oriented film is 60% or more.

9. The laminated film of claim 7, wherein the near infrared light absorber is a compound having a phthalocyanine skeleton or a nickel complex compound.

10. The laminated film of claim 7, wherein the near infrared light absorber is contained in an amount of 0.10 to 1.00 g per 1 m² of a plane perpendicular to the thickness direction of the biaxially oriented film.

11. The laminated film of claim 7, wherein the electromagnetic shielding film comprises a transparent base film and an electromagnetic shielding transparent conductive film formed on at least one side of the base film.

12. A film comprising the near infrared screening laminated film of claim 7 and an adhesive layer formed on at least one side of the film.

13. A film comprising the near infrared screening laminated film of claim 7, an adhesive layer formed on both sides of the film, a hard coat layer formed on one of the adhesive layers and a second adhesive layer formed on the other adhesive layer.

14. The film of claim 13 which further comprises an antireflection layer laminate consisting of at least two thin layers having different refractive indices on the hard coat layer.

15. A luminescent panel display having a front panel where there is adhered to the front panel of the luminescent panel display the film of claim 1 or the film of claim 5 to screen near infrared lights radiated from the display.

16. A near infrared screening film which consists of (A) a biaxially oriented film made from a polyester containing a near infrared light absorber having a weight reduction start temperature of at least 280° C. and a weight change rate of 10 wt % or less when it is kept at 280° C. for 30 minutes and which has (B) a haze value of 5% or less, (C) a total transmittance for visible lights having a wavelength of 400 to 650 nm of 60% or more and (D) optical properties at visible and near infrared ranges which satisfy the following expressions (5), (6), (7) and (8):

$$5 \leq T(850) \leq 57 \tag{7}$$

$$20 \leq T(950) \tag{8}$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are light transmittances at wavelengths of 450, 540, 620, 850 and 950 nm, respectively.

17. A near infrared screening laminated film which consists of (A') a biaxially oriented film made from a polyester containing a near infrared light absorber having a weight reduction start temperature of at least 280° C., a weight change rate of 10 wt % or less when it is kept at 280° C. for 30 minutes and an electromagnetic shielding film formed on at least one side of the biaxially oriented film, which near infrared screening laminated film has (B) a haze value of 5% or less, (C) a total transmittance for visible lights having a wavelength of 400 to 650 nm of 40% or more, and (D') optical properties at visible and near infrared ranges which satisfy the following expressions (1), (2), (5) and (6):

$$1 < T(850) < 20 \tag{1}$$

$$1 < T(950) < 20 \tag{2}$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are light transmittances at wavelengths of 450 nm, 540 nm, 620 nm, 850 nm and 950 nm, respectively, and wherein the biaxially oriented film (A') of the near infrared screening laminated film has a haze value of 5% or less and optical properties at visible and near infrared ranges which satisfy the following expressions (5), (6), (7) and (8):

$$5 \leq T(850) \leq 57 \tag{7}$$

$$20 \leq T(950) \tag{8}$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are light transmittances at wavelengths of 450 nm, 540 nm, 620 nm, 850 nm and 950 nm, respectively.

18. A near infrared screening laminated film which consists of (A') a biaxially oriented film made from a polyester containing a near infrared light absorber having a weight reduction start temperature of at least 280° C., a weight change rate of 10 wt % or less when it is kept at 280° C. for 30 minutes and an electromagnetic shielding film formed on at least one side of the biaxially oriented film, which near infrared screening laminated film has (B) a haze value of 5% or less, (C) a total transmittance for visible lights having a wavelength of 400 to 650 nm of 40% or more, and (D') optical properties at visible and near infrared ranges which satisfy the following expressions (1), (2), (5) and (6):

$$1 < T(850) < 20 \tag{1}$$

$$1 < T(950) < 20 \tag{2}$$

$$0.7 \leq T(620)/T(540) \leq 1.3 \tag{5}$$

$$0.7 \leq T(450)/T(540) \leq 1.3 \tag{6}$$

wherein T(450), T(540), T(620), T(850) and T(950) are light transmittances at wavelengths of 450 nm, 540 nm, 620 nm, 850 nm and 950 nm, respectively, and wherein the biaxially oriented film (A') of the near infrared screening film has optical properties at visible and near infrared ranges which satisfy the following expressions (7)-1 and (8)-1:

$$10 \leq T(850) \leq 28 \tag{7-1}$$

$$20 \leq T(950) \leq 55 \tag{8-1}$$

wherein T(850) and T(950) are light transmittances at wavelengths of 850 nm and 950 nm, respectively.

* * * * *